US010155210B2

(12) United States Patent
Russell et al.

(10) Patent No.: US 10,155,210 B2
(45) Date of Patent: Dec. 18, 2018

(54) STEAM REFORMER FURNACE, REFORMER FLUE GAS TUNNEL THEREFOR AND REFRACTORY COMPONENTS THEREFOR

(71) Applicant: BLASCH PRECISION CERAMICS, INC., Albany, NY (US)

(72) Inventors: William P. Russell, Watervliet, NY (US); Joseph D. Quintiliani, Troy, NY (US); Jeffrey J. Bolebruch, Amsterdam, NY (US)

(73) Assignee: Blasch Precision Ceramics, Inc., Albany, NY (US)

(*) Notice: Subject to any disclaimer, the term of this patent is extended or adjusted under 35 U.S.C. 154(b) by 247 days.

(21) Appl. No.: 15/307,054

(22) PCT Filed: Jun. 5, 2015

(86) PCT No.: PCT/US2015/034330
§ 371 (c)(1),
(2) Date: Oct. 27, 2016

(87) PCT Pub. No.: WO2015/188030
PCT Pub. Date: Dec. 10, 2015

(65) Prior Publication Data
US 2017/0080398 A1 Mar. 23, 2017

Related U.S. Application Data

(60) Provisional application No. 62/056,907, filed on Sep. 29, 2014, provisional application No. 62/023,409, (Continued)

(51) Int. Cl.
B01J 8/00 (2006.01)
B01J 8/24 (2006.01)
(Continued)

(52) U.S. Cl.
CPC ............. B01J 8/008 (2013.01); B01J 8/24 (2013.01); E04B 2/16 (2013.01); F23M 5/02 (2013.01);
(Continued)

(58) Field of Classification Search
CPC ... E04B 2/16; E04B 2/18; E04B 1/703; E04B 2002/0206; E04B 2002/0217;
(Continued)

(56) References Cited

U.S. PATENT DOCUMENTS 1,744,185 A 1/1930 Waite et al.
4,041,670 A 8/1977 Kaplan
(Continued)

FOREIGN PATENT DOCUMENTS

DE 10 2009 045 808 A1 4/2011
WO 2005/018793 A1 3/2005

OTHER PUBLICATIONS

Extended European Search Report, European Application No. 15802550.2, dated Dec. 1, 2017 (7 pages).
(Continued)

Primary Examiner — Imran Akram
(74) Attorney, Agent, or Firm — Burr & Brown, PLLC

(57) ABSTRACT

A refractory block for a steam reformer furnace tunnel includes a hollow main body, at least one first mechanical mating member defining a protruded portion extending from an upper surface of the main body, at least one second corresponding mechanical mating member defining an opening corresponding to the protruded portion formed in a portion of a lower surface of the main body, at least one third mechanical mating member defining a tab provided in a portion one of a first end and an opposed second end or a first side and an opposed second side of the main body, at least one fourth mechanical mating member comprising a groove (Continued)

formed in the other of the first end and the second end or the first side and the opposed second side of the main body, and at least one cavity formed in the lower surface of the main body.

10 Claims, 21 Drawing Sheets

Related U.S. Application Data filed on Jul. 11, 2014, provisional application No. 62/008,767, filed on Jun. 6, 2014.

(51) Int. Cl.
*E04B 2/16* (2006.01)
*F23M 5/02* (2006.01)

(52) U.S. Cl.
CPC ..... *B01J 2208/065* (2013.01); *F28F 2270/00* (2013.01)

(58) Field of Classification Search
CPC ..... E04B 2002/0226; E04B 2002/0228; E04B 2002/0232; E04B 2002/0234; E04B 2002/0247; E04B 2002/0265; E04B 2/14; E04B 2/24; E04B 5/05; C01B 2203/0233; C01B 2203/1058; C01B 3/38

See application file for complete search history.

(56) References Cited

U.S. PATENT DOCUMENTS

| 4,768,578 | A | 9/1988 | Sulit |
| 6,138,426 | A | 10/2000 | Mork et al. |
| 7,882,674 | B2 | 2/2011 | Craven et al. |
| 2007/0092415 | A1* | 4/2007 | Muschelknautz ........ B01J 19/02 422/240 |

OTHER PUBLICATIONS

Canadian Office Action, Canadian Application No. 2,949,983, dated Jan. 10, 2018 (3 pages).
International Search Report and Written Opinion, International Application No. PCT/US2015/034330, dated Nov. 13, 2015 (12 pages).
"Smart Bricks—A New Way to Build" uploaded by Kite Bricks, May 21, 2014 [retrieved Oct. 15, 2015]; retrieved from the internet <https://www.youtube.com/watch?v=_Yf0KEcXIYA#t=18> (7 pages).

* cited by examiner

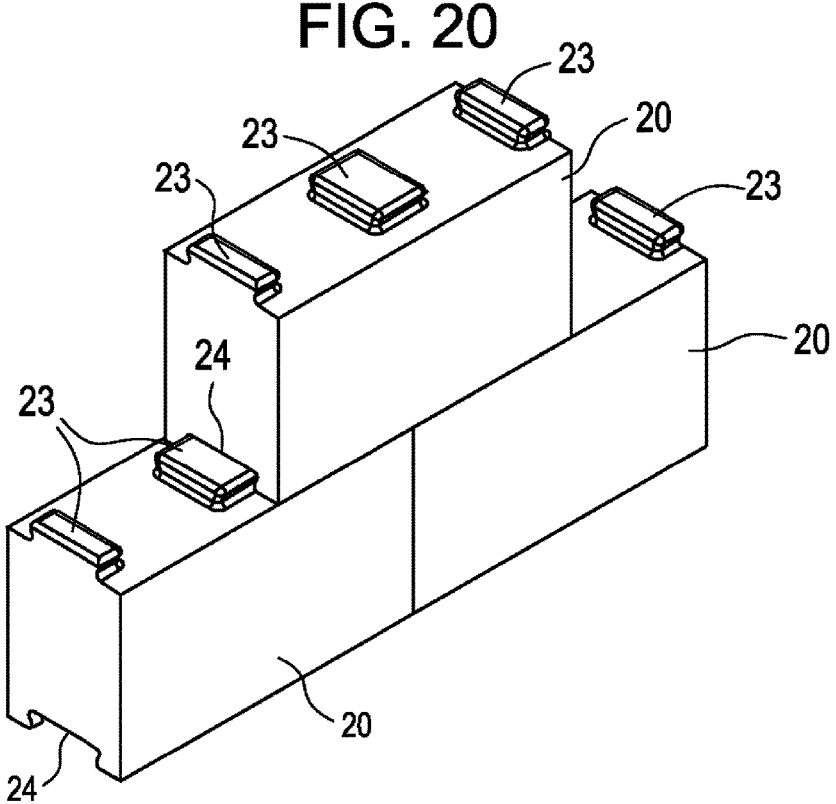
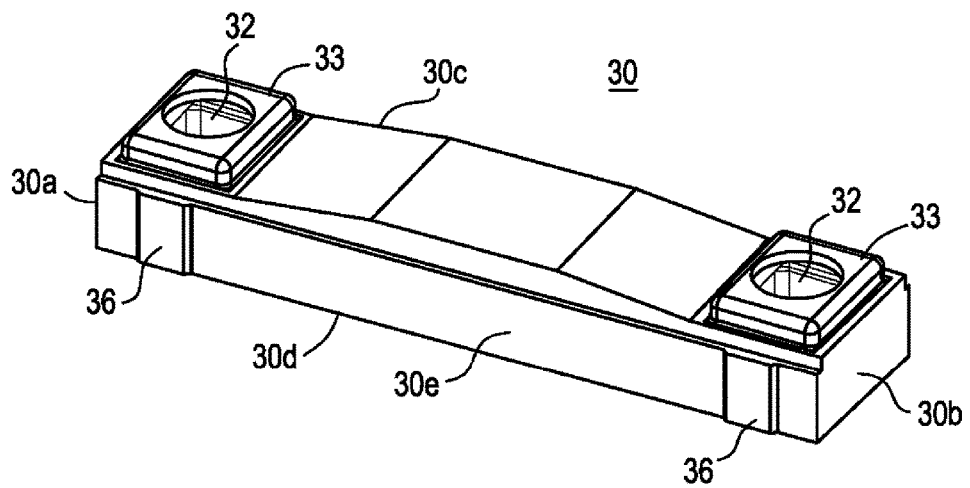

STEAM REFORMER FURNACE, REFORMER FLUE GAS TUNNEL THEREFOR AND REFRACTORY COMPONENTS THEREFOR

FIELD OF THE INVENTION

The present invention relates to a refractory tunnel, also known as a reformer flue gas tunnel, for a hydrogen reformer furnace for use in steam methane reformer processes, and refractory components therefor. More specifically, the present invention provides a light-weight, free-standing tunnel structure, without the use of mortar, that better withstands the application of hydrogen reformers, using refractory components having a more mechanically robust design and made of higher performance material than that which has been used heretofore.

BACKGROUND OF THE INVENTION

A hydrogen reformer furnace converts natural gas into hydrogen through a series of catalytic reactions. One of the most prevalent routes for the conversion of methane ($CH_4$) to petrochemicals is either through the manufacture of hydrogen, or a mixture of hydrogen and carbon monoxide. This hydrogen/carbon monoxide material is referred to as "Synthesis Gas" or "Syngas." Indeed, steam methane reforming (SMR) of natural gas or syngas is the most common method of producing commercial bulk hydrogen as well as hydrogen that is used in the industrial synthesis of ammonia. At temperatures around 1000° C., and in the presence of metal-based catalysts, steam reacts with methane to yield carbon monoxide and hydrogen. These two reactions are reversible in nature:

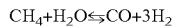

$$CH_4 + H_2O \leftrightarrows CO + 3H_2$$

The reaction is endothermic and requires the input of large amounts of heat in order to be sustained. Heating gas accounts for 80% of the total process gas requirement.

A common type of hydrogen reformer furnaces is known as a "top down," or "down fired" furnace. FIG. 1 is a perspective cut-view of a conventional hydrogen reformer furnace 800. Natural gas burners (not shown) are spaced at the top of the furnace 800 in between rows (also known as lanes) of catalyst pipes 70, and produce heat through combustion. The burners fire downward, parallel to the hydrocarbon-steam mixture flow, direction through the catalyst tubes 70, which are centrifugally cast chrome-nickel tubes that are typically 10-40 feet long, and mounted vertically in the furnace 800. The tubes 70 contain an activated nickel catalyst on alumina carriers in the form of pellets or balls, for example. The process gas and steam are fed downward over the catalyst and removed from the bottom of the tubes 70.

The primary reformer operates at temperatures in the 700-800° C. range. The hot gas is then passed into a convective heat transfer zone, and steam is generated and may be fed back into the primary reformer. This unit is used to produce synthetic fuel that may be turned into a variety of liquid fuels for powering internal combustion engines. It is also often used to produce hydrogen for other processes in the plant burner whereby flame and hot gas radiation provide heat input to the tubes to support the highly endothermic reaction. The air exits out one side of the bottom of the furnace 800. Based on the location of the burners and the furnace exit, the air flow and heat distribution are non-uniform. In this situation, it is common for the hot gasses with flow directly to the exit, creating a cold area in the back of the unit and a hot spot just before the exit which can reach temperatures high enough to damage the catalyst tubes. In order to correct for this, flue gas tunnels 80 are provided, which act as collection ducts for the combustion gases, promoting even heat distribution in order to improve efficiency and prolong the life of the tubes 70.

While SMR is a well-established process, and efforts have been made over time to optimize many facets of the technology in order to increase efficiency, most of the focus has been centered on improving aspects of these reformers with respect to the catalyst, metal alloys, burners, feed stocks, etc. However, one piece of SMR technology has been completely ignored where advancements are concerned. That is, the refractory designs used in the construction of these units have remained stagnant for decades. In particular, the flue gas tunnels which transport combustion gasses through the fired heaters have not been changed despite the clear need for improvement based on performance reliability issues.

These tunnels 80 average about 8 feet in height, 3 feet in width and run the full length of the furnace unit 100 (e.g., 40 ft-50 ft). Because of the size of these tunnels 80 and the volume of refractory materials used in their construction, they have traditionally been fabricated using basic brick shapes (e.g., standard rectangular shapes, shown in FIG. 2), in a similar manner to constructing any structural brick wall. The walls 81 of the tunnels 80 are then topped with a series of rectangular blocks 82 that form a lid (see, e.g., FIGS. 1-3). Historically, conventional tunnel walls 81 have been very prone to mechanical failure under heat and over time. The main modes of failure for these flue tunnels are related to refractory design, installation technique, mechanical abuse in service, and initial material selection.

Even though they are problematic, these tunnels 80 are essential in order for the furnace unit 800 heat evenly and achieve the required efficiency. For example, if a down fired reformer did not include such tunnels 80 in its unit construction, all of the combustion gasses would rush into the flue at the exit of the reformer. This would create uneven temperatures throughout the unit with cold areas away from the flue and hot spots near the exit of the unit, as discussed above. As a result, the reformer would not only experience reduced efficiency, but would also overheat the catalyst tubes near the exit, causing premature failure to occur.

The design and construction of conventional flue gas tunnels 80 in SMRs involves the use of flat bricks with typical dimensions of 3 in×9 in×6.5 in. The walls 81 are constructed so that half blocks are left out in regular patterns to allow for gas passage through the wall 81 into the tunnel 80 (not shown). Typically, the bricks are mortared in place during construction in order to hold the walls 81 together. A common alternative to the standard flat brick is a standard tongue and groove brick 83, 84 (see, e.g., FIGS. 4 and 5). While many sizes and configurations of these types of bricks exist, such conventional bricks typically use a simple tongue and groove feature to mechanically engage each other when vertically stacked in the common manner. As shown in FIGS. 4 and 5, conventional bricks 83, 84 include simple tongue 832, 842 and groove-style mating features 833, 843 that fit together when vertically stacked.

In the past, in conventional tunnel structures, large expansion gaps have been provided, located every 6-10 ft along the tunnel walls in order to account for thermal expansion in the system. The expansion gap is a critical aspect of design and construction, because the anticipated thermal growth must be accommodated. In this case, however, due to the presence of these large expansion gaps, every tunnel is actually made up of several large free-standing walls. In order to help support these free-standing sections of tunnel wall, intermediate support walls or pilasters are therefore also provided (not shown). These intermediate support walls connect the outer walls of tunnels between catalyst tubes in order to prevent the walls from leaning or collapsing. Pilasters, also known as buttresses, serve the same purpose, and are structured as columns of bricks located outside of the tunnel walls (not shown).

Another feature of the tunnel wall construction is the end wall (not shown). Also known as cross-over walls or target walls, these brick wall segments connect tunnels at the exit of the unit, preventing gas by-pass through the surrounding lining. In addition to providing additional lateral support, the end walls also ensure that all combustion gasses properly exit through the flue gas tunnels 80.

Once the tunnel walls are constructed, the tunnel covers (lids) are placed on top. These covers, often called coffin covers, are typically made from large slabs of refractory material. However simple the design may be, they serve an important purpose, because failed covers decrease the unit efficiency, cause tunnel wall failure as they fall, and contribute to shorter tube life. There are four main styles of coffin covers. The main style is a rectangular or square solid design (see, e.g., lid 82 in FIG. 3). This represents the traditional approach, and is simply a solid slab of refractory material that spans the horizontal distance (gap) between walls 81. These solid covers 82 can also have a notched surface or otherwise be formed with a mating feature on the bottom or sides that can mechanically engage with the tunnel walls and provide additional support (not shown). Another style is the hollow or extruded lid 821 (see, e.g., FIGS. 6 and 7). These types of covers 821 have the same outer dimensions as the rectangular solid lid 82, but include a pair of hollowed-out sections (cavities) 822 in the middle to reduce the weight of the lid and the resulting stresses.

Another common cover design is the off-set cover 831, as shown in FIG. 8. This solid lid features a slanted geometry that facilitates engagement between adjacent covers, which offers extra support during upsets and which can help support cracked lids in the event of a cover failure. FIG. 9 shows a tongue and groove cover 851, which is a another version of the off-set cover 831, but whose mechanical mating features (i.e., tongue 851a, and groove 851b) provide even more engagement with adjacent lids 851.

One of the current types of failures seen in the field is the collapsing of a section of lids, or all of the lids, over the entire length of the tunnel. Once installed, the lids act as a beam, and a crack in the middle of the lid is often the result of the ratio between the span and the material thickness. The cross-section (thickness) of the replacement lids is then increased, but after another campaign, the failure is typically even worse than before. This is because the lid failure is not a result of static load. Hand calculations coupled with computer simulation have shown that the static load alone imparts very little stress on the lids, and will not result in a failure. Computer run finite element analysis (FEA) of a 9 in W×9 in T×42 in L solid rectangular lid (see, e.g., FIG. 3) installed on a tunnel at a constant service temperature of 1900° F. demonstrated that the lid has no external forces acting upon it other than its own weight. The result is a maximum stress of a very modest 10 psi.

With many materials, the modulus of rupture (MOR) decreases significantly at higher temperatures, and it is possible to select a low grade refractory lid material whose MOR decreases at operational excursion temperatures to a point that even the mild stresses associated with the static load can result in failure. However, most engineered refractory material suppliers characterize the hot modulus of rupture (HMOR), and supply a material option for lids that have a high enough HMOR so that even with the decrease in strength, the static loads still have a very significant factor of safety associated therewith. Based on the comparison of the FEA results to the published HMOR, it has been concluded that most lid failure is not a result of static load alone, and is therefore a result of stresses associated with the thermal state.

Thermal stresses in such a situation manifest several ways. One way the components can fail is if the thermal expansion is not properly managed, resulting in excessive compressional force. Since the lids are placed on top of the wall sections and the only constriction is either friction or mortar, the thermal expansion will not be constricted to the point of failure. The HMOR of commonly used refractory mortars is roughly 500 psi, well below that of the refractory material selected for the tunnel lid, so if the thermal stresses reach that level, the mortar will break and the lid will be free to expand as necessary.

The component can also fail as a result of thermal stress that occurs as a result of any temperature differential incurred during operation, and is not limited to instances of large upsets. Thermal stress failure results when the thermal expansion from one area of a component is different from another area resulting in a stress greater than the yield strength of the material. If the temperature in the convection section of the furnace is different than the temperature inside the tunnels, even for a short period of time, the potential for thermal stress is present. FEA of a 9 in W×9 in T×42 in L solid rectangular lid (see, e.g., FIG. 3) installed on a tunnel with a temperature on the top surface of the lid at 1910° F. and a temperature on the bottom surface of the lid at 1900° F. has shown that the lid has no external forces acting upon it, other than its own weight. A differential temperature of 10 degrees across the lid results in a max stress of 1500 psi, which is above the HMOR of lower end refractory materials. In a situation where a very large number of the lids of a tunnel all failed during the same campaign without any of the walls collapsing, it is most likely that the mode of failure was thermal stress.

Another important factor in the performance of the tunnel lids is the material's creep resistance. Creep occurs when a material slowly but permanently deforms under long term exposure to high levels of stress that are below the material yield strength. The result on the tunnel walls is a transmission of the lids mass in the vertical direction, which compliments the strength and structure of the wall. Creep of a lid will result in a "sagging" of the center span and will change the interaction force between the lid and the tunnel walls, and eventually lead to a failure. Creep can be characterized with ASTM standard testing, which is representative of the use of a tunnel lid in service and is an important component to material selection. ASTM tests on Super Duty Brick have published results of a 7.86% deflection at 2,600° F. The result on the tunnel walls is a transmission of the lids mass at an angle that is a few degrees off of the vertical axis and which encourages the walls to separate further apart from one another at the top than at the bottom.

A full tunnel collapse can actually be the result of several different modes of failure. Conventional tunnel construction uses hundreds of thousands of pounds of refractory brick and lids, all of which accounts for mass that ultimately rests on a final base layer of insulating fire brick (IFB; not shown in FIGS. 1A and 1B). Conventional tunnel cross-sections with bricks that are 6 in wide, tunnel walls that are 96 in tall, and a solid lid that is 9 in thick results in a load on the supporting IFB layer of 11.6 psi. Published data using ASTM testing shows that at the temperatures present in the reformer furnaces, the base IFB layer will deform a full 1% under those loads in 100 hours. The deformation of the base IFB layer translates in one of two ways: either the deformation will prematurely compress the fiber allowances for thermal expansion, or the deformation will reduce the overall insulating value of the base IFB. Both instances are known to result in failure.

The effects of temperature and tunnel mass are not limited to the internals of the furnace, but can also cause deformation of the supporting furnace structure, leading to a non-uniform furnace floor. Conventional tunnel designs utilize mortared joints to secure the bricks to one another, effectively turning the large number of small bricks into a small number of large wall sections. These wall sections act as a single body, and cannot accommodate any major dimensional change in the furnace floor. Deformation of the supporting furnace structure will therefore result in the failure of a conventional tunnel.

Differential thermal expansion occurs not only in situations with different design materials, but also across large sections of materials that are expected to act as a single body. Conventional tunnel design also uses fiber expansion joints roughly every 6-10 feet of wall length, with all of the building components in between adhered to one another with a refractory mortar. This refractory mortar also causes the wall sections to behave as a single body. No furnace has a completely uniform temperature distribution, however, and at some point, differential thermal expansion will occur across a wall section. The stresses imparted on the wall section are the same as those that cause thermal shock within a singularly body.

FEA has been performed to determine stress levels associated with a differential temperature from the top of a fully mortared 10 ft wall section to the bottom, where the fully mortared wall section was treated as a single body for the purposes of the analysis. The bottom of the wall section was 1925° F. and the top of the wall section was 1900° F., with a uniform temperature distribution in between. The FEA also included a simulated weight of the tunnel lids and gravity, but no other external forces. It was shown that the stress of the system exceeds the 500 psi HMOR of a standard refractory mortar. Since the mortar joints are the weakest point on the wall, they crack to alleviate the stress. The more cracking that occurs in the mortared wall, the smaller the wall sections become, and the lower the stresses become in any one section.

Properly accommodating for thermal expansion is one of the most difficult aspects of any thermal application design. Conventional tunnel designs use a different materials and designs for the tunnel lid and the tunnel base. Many tunnels have low density refractory or fiber insulation in the "base" area in between the wall supporting IFB columns. The tunnel lid can expand as much as ⅜ in, thereby pushing the tunnel walls apart, whereas the fiber insulation will not impart any expansion forces on the tunnel walls. The resulting trapezoidal shape is susceptible to buckling and collapsing. In certain situations, tunnels have been found at the conclusion of a furnace campaign to have alternative movement in the lateral direction. This is more commonly known as "snaking," and is the result of the overall tunnel attempting to expand greater than the built-in allowance. This movement will crack the mortar, separate the walls from lids, and push the walls off of the IFB base; all of which lead to failure. While traditional tongue and groove brick design with a circular cross section (see, e.g., FIGS. 4 and 5) is somewhat effective in preventing lateral movement, this arrangement does will not sufficiently arrest buckling, as the rotation of one block relative to the block below it will separate the tongue from the groove, allowing a full system collapse (see, e.g., FIG. 15).

In addition to the above problems with the traditional wall design and components themselves, installing a conventional tunnel system requires a number of skilled labor positions that are becoming increasingly challenging to fill, particularly for temporary needs. This often creates a situation where the proper level of skilled labor is not available, and the overall quality of resultant installed tunnel system is compromised or the installation costs become higher than expected. In some instances, a conventional tunnel system has simply operated for the full amount of its originally projected life span, but due to short time frame of a turnaround schedule the tunnel cannot be fully repaired or replaced and must continue to perform for an extended campaign. The length of time and the high skill level required to install a conventional tunnel system therefore becomes a cause for the reliability issues. The full extent of damage that may be imparted to a tunnel system is often unknown prior to a turnaround, so a maintenance engineering crew has only a few weeks to examine, design, and implement repairs that are meant only to keep the tunnel system operational until the next turnaround, where this kind of repair can be attempted again. This is can be a very dangerous gamble for a plant, based on the long lead time and installation time associated with replacing the tunnels when a failure results in an unplanned outage.

The extended time frame and high level of skill required for installation and repairs imparts undesirable variability in quality output for conventional tunnel systems. Repairs that end up taking longer than the available window of plant turnaround time are not a viable option, and often result in an undesirably extended tunnel campaign. There is a strong desire to reduce the overall installation time and need for highly skilled labor in order to decrease this variability in quality. In some cases, conventional tunnel systems require overhead cranes to be installed to assist in the handling of the heavy tunnel lids.

SUMMARY OF THE INVENTION

The object of the present invention is to provide a light-weight, free-standing tunnel structure, without the use of mortar, that better withstands the application of hydrogen reformers, using more mechanically robust refractory components that are made of higher performance material. More specifically, it is an object to the present invention to overcome the drawbacks of the prior art by providing light-weight, structurally stable parts, implementing system designs that avoid putting individual components into tension, and using designs with a network of evenly distributed, highly engineered expansion gaps that ensure the correct amount of room for thermal growth, but which do not require any precision measurement at installation.

According to the present invention, a refractory tunnel assembly for a steam reformer furnace is provided. The tunnel assembly comprises a plurality of hollow base components, each base component comprising a plurality of corresponding mechanical mating members, a plurality of hollow wall blocks, each wall block comprising a plurality of corresponding mechanical mating members that further correspond to the mechanical mating members of the base components, and a plurality of hollow lid components, each lid component comprising a plurality of mechanical mating members that further correspond to the mechanical mating members of the base components and the wall blocks. The base components are arranged to extend in a horizontal arrangement direction (first direction) defining a width of the tunnel assembly and in a longitudinal arrangement direction defining a length of the tunnel assembly. The wall blocks are stacked upon and mechanically interconnected to the base components via the corresponding mechanical mating members, without the use of mortar, in a vertical arrangement direction (second direction) and along the longitudinal arrangement direction, and are stacked upon and mechanically interconnected to one another via the corresponding mechanical mating members, without the use of mortar, in both the vertical and longitudinal arrangement directions, to define two parallel tunnel walls, spaced a distance apart from one another in the horizontal arrangement direction (defining an internal width of the tunnel), that extend upwardly from the base components in the vertical arrangement direction and extend along the length of the tunnel assembly (in the longitudinal arrangement direction) on the base components. The plurality of lid components are stacked upon and mechanically interconnected to the wall blocks via the mechanical mating members, without the use of mortar, in the vertical arrangement direction and along the longitudinal arrangement direction, so that the lids extend along the longitudinal arrangement direction and across horizontal arrangement direction in order to cover the distance between the two tunnel walls in the horizontal arrangement direction along at least a portion of the length of the tunnel assembly.

Preferably, the base components, the wall blocks and the lid components all comprise the same material.

According to one aspect, the plurality of mechanical mating members comprise at least one pair of male and female components provided in corresponding locations on upper and lower surfaces of each of the base components, the wall blocks and the lid components.

Preferably, the male components comprise a protruded portion extending from the upper surfaces of each of each of the base components, the wall blocks and the lid components, and the female components comprise a corresponding opening in the lower surfaces of the each of the base components, the wall blocks and the lid components.

According to another aspect, the at least one pair of corresponding male and female components comprises two pairs of male and female components provided in corresponding locations on upper and lower surfaces of each of the base components, the wall blocks and the lid components.

It is also preferred that at least a portion of the plurality of the wall blocks further comprises at least one through-hole formed in opposed side surfaces thereof, the though-hole being in communication with the tunnel but not being in communication with an inner cavity of the hollow wall blocks.

Preferably, at least a portion of the plurality of wall blocks further comprise a tie bar cradle formed in a side surface thereof proximate an upper surface thereof, and that the refractory tunnel assembly further comprises at least one tie bar extending between the tunnel walls in the horizontal arrangement direction.

According to another aspect of the present invention, a refractory block for a steam reformer furnace tunnel is provided, the refractory block comprising a hollow main body portion having an outer peripheral surface defining a first end, an opposed second end, an upper surface, an opposed lower surface, a first side and an opposed second side. At least one first mechanical mating member defining a protruded portion is provided, extending from a portion of the upper surface of the main body portion, at least one second corresponding mechanical mating member defining an opening corresponding to the protruded portion is formed in a portion of the lower surface of the main body portion, at least one third mechanical mating member defining a tab is provided in a portion one of the first end and the opposed second end or the first side and the opposed second side of the main body portion, at least one fourth mechanical mating member comprising a groove corresponding to the tab is formed in the other of the first end and the second end or the first side and the opposed second side of the main body portion, and at least one cavity is formed in the lower surface of the main body portion of the refractory block.

Preferably, a wall thickness of the refractory block is in a range of 0.65 to 0.875 in.

It is preferred that the at least one first mechanical mating member comprises two first mechanical mating members, and the at least one second corresponding mechanical mating member comprises two second corresponding mating members.

According to one aspect of the present invention, the block comprises a base component for a tunnel assembly, and the at least one third mechanical mating member comprises two tabs provided in horizontally opposed portions of one of the first side and the opposed second side of the main body portion, and the at least one fourth mechanical mating member comprises two grooves formed in corresponding positions on the other of the first side and the opposed second side of the main body portion.

According to another aspect of the present invention, the block comprises a lid component for a tunnel assembly, and the at least one third mechanical mating member comprises two tabs provided in horizontally opposed portions of one of the first side and the opposed second side of the main body portion, and the at least one fourth mechanical mating member comprises two grooves formed in corresponding positions on the other of the first side and the opposed second side of the main body portion.

According to another aspect of the preset invention, the refractory block comprises a wall block for a tunnel assembly, and the tab of the third mechanical mating member is provided in a portion of one of the first end and the opposed second end of the main body portion, and the groove (of the fourth mechanical mating member) corresponding to the tab is formed in the other of the first end and the second end of the main body portion. It is also preferred that the wall block further comprises at least one through-hole having opposed openings formed in the first side and the opposed second side of the block, and which is not in communication with the at least one cavity of the main body portion of the refractory block.

Thermal stresses associated with a temperature differential across a body can result in failure from thermal shock. There are a number of approaches that are utilized to reduce the thermal stresses below the yield strength of a refractory component. Decreasing the wall thickness of the refractory component allows for the thermal conductivity of the material to equalize the wall temperature and eliminates the stresses associated with the thermal differential. The wall thickness should be as thin as possible without sacrificing the overall stability of the tunnel system. Since the tunnel system is only self-supporting, reducing the wall thickness of all of the components also decreases the overall system weight.

Providing the optimal wall thickness is achieved by the proper balance of strength and weight. Thinner walls reduce thermal stresses and system weight, but thicker walls can support more load. In view of the above, the wall thickness is preferably in a range of about 0.5 in-1.5 in, most preferably in a range of 0.625 in to 0.875 in. The desired weight for each component is specified herein, and is about 40 lbs-60 lb for the blocks, 50 lb-75 lb for the lids, and 70 lb-150 lb for the bases.

In addition to reducing the wall thickness of the individual components, the "sections" of the tunnel system are reduced so that the differential temperature seen by a single section is minimized. Ideally the "sections" of the tunnel system should only be as large as the individual building components. In order to accomplished this, every block must manage its own thermal expansion, and the entire system must be mortar-free, but for stability maintenance, must be completely interconnected. This is accomplished by providing precision formed, robustly mechanically inter-connectable refractory components, and an installation procedure that automatically accommodates for the variability in each component.

In order to ensure proper thermal expansion management, the tunnel system also utilizes a base component that is made of the same material and has substantially similar dimensions with respect to the lid (cover) component. This ensures that the tunnel expands and contracts equally on both the top and bottom of the wall, maintaining the overall structure and reducing stresses that could otherwise cause buckling. Buckling can also be arrested by virtue of the robust and tight tolerance interlocking mechanical mating feature provided in the wall components, so that the rotation of a block in relative to a block below it does not break direct contact.

Even if the thermal expansion is properly managed, in order to further prevent buckling from still being an issue as a result of delayed ignition or a non-uniform furnace floor, cross-beams or tie bar (tie rod) supports are also provided at predetermined locations.

Proper material selection and installation procedures are also important to prevent "snaking." Many materials will increase in overall dimension when re-heated, increasing variability and adding challenge to the thermal expansion management. Because the coefficient of thermal expansion for refractory components is nonlinear, it must be fully characterized and understood to ensure that proper expansion joints are created. Selecting a suitable material has always been about compromise and sacrifice in connection with conventional tunnel designs. That is, conventionally, bricks that have sufficient insulating value to keep the furnace supports from deforming do not always also have enough strength to adequately support the tunnel system, and bricks with higher strengths do not have the required insulating value. Conventional materials include various types of fire bricks and super duty brick.

The coefficient of thermal expansion (CTE) for the selected material should not simply be assumed as a linear function for the materials used in the tunnel system. Having a fully characterized CTE is preferable for ensuring that the expansion behavior is properly managed. This becomes even more critical when the thermal expansion is managed on a single component level. Proper material selection preferably includes confirming that the modulus of rupture at the service and excursion temperatures of the furnace has a sufficient safety factor when compared to the associated static load stresses. Selecting a material with an improved HMOR provides immediate increases to the safety factor in the system. Knowing the room temperature MOR of a refractory material alone is not sufficient for proper design of a tunnel system.

In addition, any material being selected for use in a reformer furnace should preferably have the highest resistance to creep reasonably available, as a reduced creep will prolong the life of the tunnel system and prevent premature failures. The use of a material with improved creep resistance reduces the tension on the bottom side of the top lids, and reduces the outward force that the top lids exert onto the brick walls of the tunnel, which is preferred. Using a material having a fully characterized CTE, higher HMOR, and increased creep resistance together improves the overall reliability of the tunnel system.

In view of the above, in the present invention, suitable materials for the bricks (blocks), bases and the covers (lids) include, but are not limited to alumina-based refractory materials, cordierite (magnesium aluminum silicate), and zirconia, for example. More preferably, the blocks, lids and bases are made from a material selected from the group consisting of medium duty fire clay brick (Oxide Bonded Alumina comprised of at least 30% alumina by weight), high duty fire clay brick (Oxide Bonded Alumina comprised of at least 35% alumina by weight), super duty fire clay brick (Oxide Bonded Alumina comprised of at least 40% alumina by weight), and high alumina fire clay brick (Oxide Bonded Alumina comprised of at least 60% alumina by weight). Most preferably, the present invention utilizes Mullite Bonded Alumina comprised of 88% alumina by weight or an Oxide Bonded Alumina comprised of 95% alumina by weight.

The tunnel according to the present invention also utilizes a base component that distributes the weight load of the wall over an area that is roughly 5 times larger than the conventional design. The light-weight design of the present invention, coupled with the inventive base component, typically results in a load on the base layer of 1.4 psi. This allows for the use of highly insulating materials, which improves the overall reliability of the structural furnace supports and therefor the overall system.

As mentioned before, a conventional tunnel cross-section, with bricks that are 6 in in width, tunnel walls that are 96 in tall, and a solid lid that is 9 in thick, results in a load on the supporting IFB layer of 11.6 psi and a deformation of 1% within the first 100 hours of the campaign. Decreasing the overall weight of the entire tunnel system by 60% translates into a significantly lower PSI load, and results in an order of magnitude less deformation to the base layer, thus increasing the effective production life and efficiency of the tunnel.

With the reduced wall thickness and improved materials provided according to the present invention, the light-weight tunnel lids can be easily installed or removed by two laborers. In addition, the light-weight, mortar-free block design with interlocking components is easily handled by one laborer, and the tunnel structure can assembled, repaired and/or disassembled as necessary without significant consequence or the requirement for high levels of skill. Cross beam supports (i.e., tie bars) can be easily added or removed without limiting access to other tunnel components during turnarounds, ensuring that repairs can be complete and effective. Faster installation and repair time also allows for proper repairs to be made more readily, improving the overall reliability of the system.

Reducing the weight of the components, while maintaining the structural integrity of the building blocks, makes it possible to eliminate much of the crushing force on the lower courses of the brick. Providing light-weight, structurally correct cover (lid) segments overcomes the drawbacks previously associated with making those components thicker in order to be stronger, which also detrimentally added additional load to the entire system. The incorporation of expansion gaps between each brick and elimination of mortar from the system ensures that the assembly can expand and contract without the creation of large cumulative stress, and reduces the installation time of the tunnel as a whole.

BRIEF DESCRIPTION OF THE DRAWINGS

For a better understanding of the nature and object of the present invention, reference should be made to the following detailed description of a preferred mode of practicing the invention, read in connection with the accompanying drawings, in which:

FIG. 20 is a perspective view of a partial assembly stack of blocks shown in FIG. 18;

FIG. 21 is a perspective top view of a full width base component according to the present invention;

DETAILED DESCRIPTION OF THE INVENTION

Blocks (Also Referred to herein Interchangeably as Bricks)

The flue gas tunnel according to the present invention comprises a plurality of refractory blocks or bricks that are engineered with precision interlocking mechanical mating features to facilitate stacking interconnection to form the free-standing tunnel walls without the use of mortar. These mechanical mating features are also specifically designed to allow for thermal expansion in service while simultaneously preventing the wall from becoming disassembled prematurely.

Figure 10:
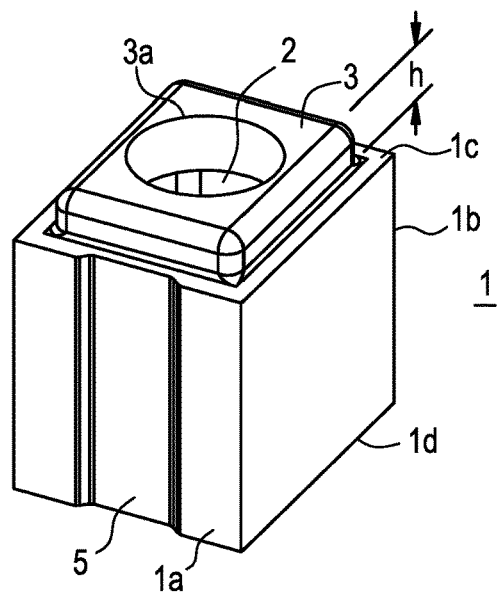
FIG. 10 is a perspective top view of a half block (brick) according to one aspect of the present invention.
Figure 11:
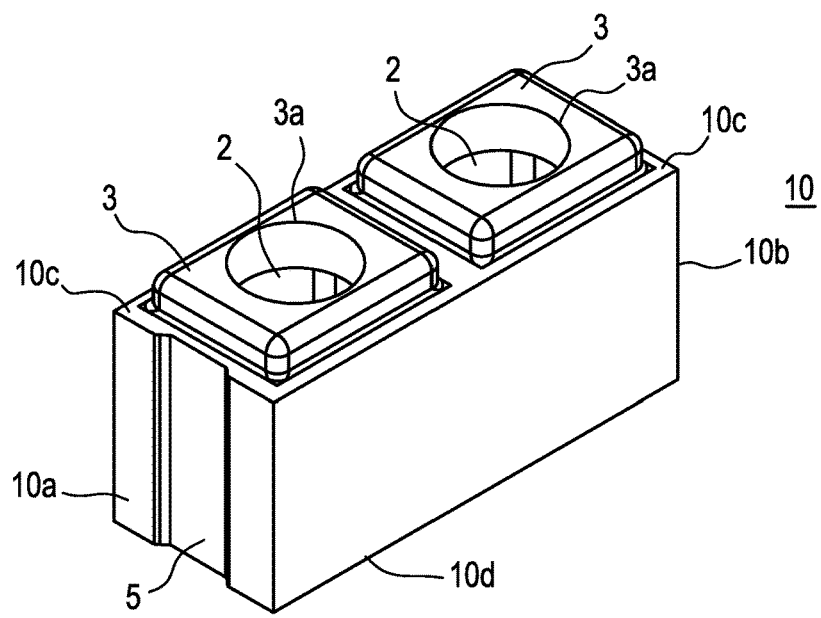
FIG. 11 is a perspective top view of a full block (brick) according to one aspect of the present invention.
Figure 12:
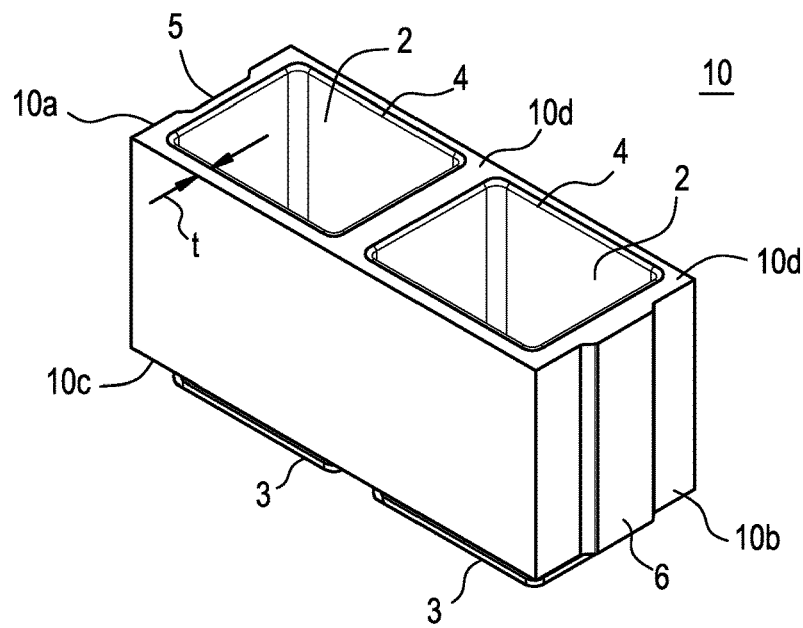
FIG. 12 is a perspective bottom view of the full block shown in FIG. 11.

One example of a mating feature has a geometry that requires horizontal installation and prevents the block from becoming disassembled vertically. FIG. 10 shows a "half brick" 1 and FIG. 11 shows a "full brick" 10 according to this aspect of the present invention. FIG. 12 is a bottom view of the full brick 10 shown in FIG. 11. It should be understood that the corresponding bottom view of the half brick 1 shown in FIG. 10 (not shown) would be same as that shown in FIG. 12, only half the size. A standard brick has dimensions of, for example, 6.5 in W×18 in L×10 in T (tall), but the design is applicable for bricks as small as 2 in W×4 in L×2 in T and for bricks as large as 9 in W×24 in L×18 in T, as well. Preferably, each block (brick) has a weight in a range of 20-70 lb, more preferably 40-50 lb, so that one person can readily maneuver the blocks alone, while reducing the total number of blocks needed to construct the tunnel wall to the smallest number possible.

Each of the bricks 1, 10 has an outer peripheral surface defining a first end (1a, 10a), an opposed second end (1b, 10b), an upper surface (1c, 10c) and an opposed lower (bottom) surface (1d, 10d). These bricks 1, 10 are hollowed out to remove all possible material from non-critical areas. Preferably, the wall thickness "t" (see, e.g., FIG. 12) walls of these bricks 1, 10 is in a range of 0.5-1.5 in, preferably 0.625-0.875 in. The resultant tunnel assembly has only about 60% of the weight of a conventional tunnel. The hollowed-out portions define one or more, preferably a plurality of cavities 2 in the respective blocks 1, 10.

The upper surfaces 1c, 10c of the blocks 1, 10 each include a male part of the precision interlocking mechanical mating features of the refractory blocks according to the present invention. The protruding portion 3 is elevated a distance from the surface 1c, 10c to define a geometrical member that extends from the block 1, 10 and serves as a locking part that fits precisely into the opening 4 formed in the lower surface 1d, 10d of the blocks 1, 10. As shown, the protruding portion 3 is a substantially rectangular elevation with chamfered corners and a circular opening 3a passing through its center and in communication with a cavity 2. The circular opening 3a is merely a function of manufacturing and material removal considerations, and is not critical. As shown in FIGS. 10 and 11, the openings 3a are in communication with the cavities 2. This is not always the case, however, as described in more detail below.

While the exact shape of the protruding portion 3 is not necessarily limited to the shape shown here, it is preferably a geometric match to the shape of the corresponding opening 4, with a slight off-set to accommodate manufacturing tolerances. The protruding portions 3 of the blocks 1, 10 must fit precisely within the openings 4 of the vertically adjacent blocks 1, 10 to securely engage the vertically adjacent blocks 1, 10 to one another to facilitate the construction of free-standing tunnel walls without the use of mortar. There must also be sufficient tolerance to account for the thermal expansion considerations discussed above, and to maintain contact to prevent buckling.

Figure 13:
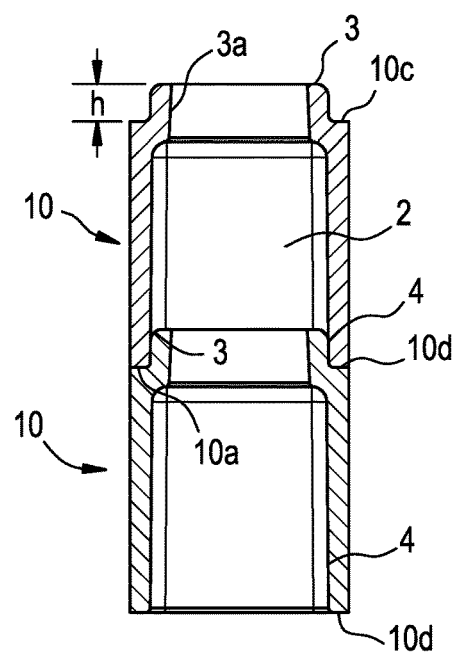
FIG. 13 is a sectional end view of two blocks shown in FIG. 11 in a stacked arrangement.

The opening 4 communicates with the cavities 2 of the blocks 1, 10, and receives the protruding portion 3 in a tight, interlocking manner to securely connect the blocks 1, 10 to one another, without mortar, in a vertically stacked manner, as shown in FIG. 13. The shape of the opening 4 is not critical, so long as it precisely corresponds in shape and size to the shape and size of the protruding portions 3, in consideration of the mechanical factors and thermal concerns discussed above.

The importance is the geometric match with a slight off-set between the corresponding protruding portion 3 and opening 4 into which the protruding portion 3 fits. Preferably, the off-set is in a range of 0.020 in to 0.060 in. The minimum off-set is dictated by manufacturing tolerance capabilities resulting in block to block variability. There must be sufficient height and tightness to securely engage if buckling occurs. Preferably, the overall height "h" of the protruding portion 3, or distance that the protruding portion 3 extends from the upper surface 1c, 10c of the blocks 1, 10, is at least 0.75 in, in order to ensure sufficient engagement with the opening 4 and prevent buckling. The dimensions of the opening 4 should be as tight to the protruding portion as possible with allowance for manufacturing variation. Ideally, uniform wall thickness balanced with manufacturing needs governs the dimensions.

The individual blocks 1, 10 further include additional mechanical mating features, such as a tab on one end and a groove on the other end, with a gap provided that allows each block to expand with increasing operating temperature until its seals against the blocks on either side thereof in the horizontal arrangement direction. As shown in FIGS. 10-12, the first sides 1a, 10a of the blocks 1, 10 include a groove or slot 5, and the opposed second sides 1b, 10b are formed to include a corresponding "tab" or protrusion 6 that vertically fits into the corresponding groove 5 of a horizontally adjacent block 1, 10. Preferably, the groove is larger than the tab by a minimum of manufacturing variation; preferably, the tab is 30-75% of the overall width of the block.

A compressible high temperature insulation fiber (not shown) can also be provided, placed in the groove 5 in order to reduce gas bypass while accommodating for a range of temperature fluctuations in service. The fiber is specified to have sufficient compression variability so as to reduce gas bypass over a wide range of operating temperatures from 600° C.-1200° C. This fiber can also be used in between layers of blocks to prevent point loading. As discussed below, the base components and top lids (covers) both have a similar tab and groove design, and use either a fiber gasket or a fiber braid to reduce gas bypass over the range of operating temperatures.

Figure 1A:
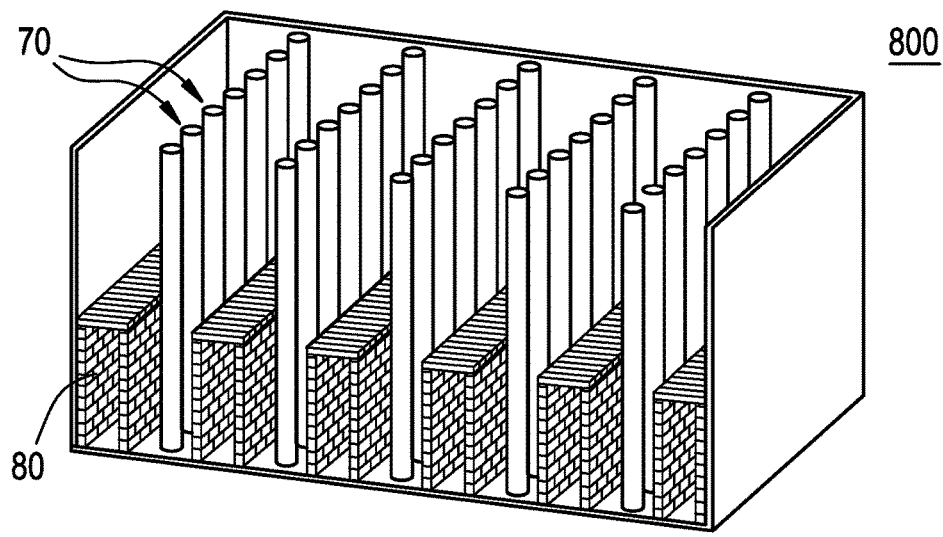
FIG. 1A is a perspective cut-view of a conventional hydrogen reformer furnace.
Figure 1B:
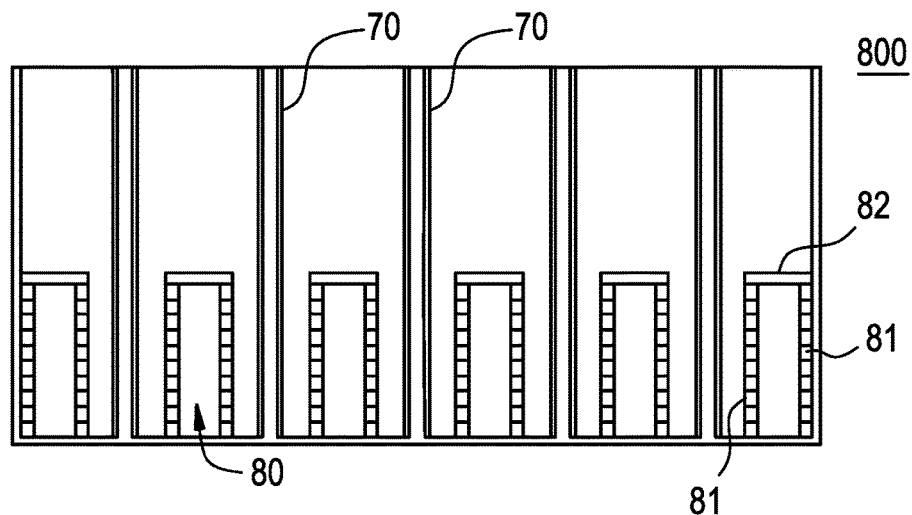
FIG. 1B is a sectional end view of the furnace shown in FIG. 1A.
Figure 2:
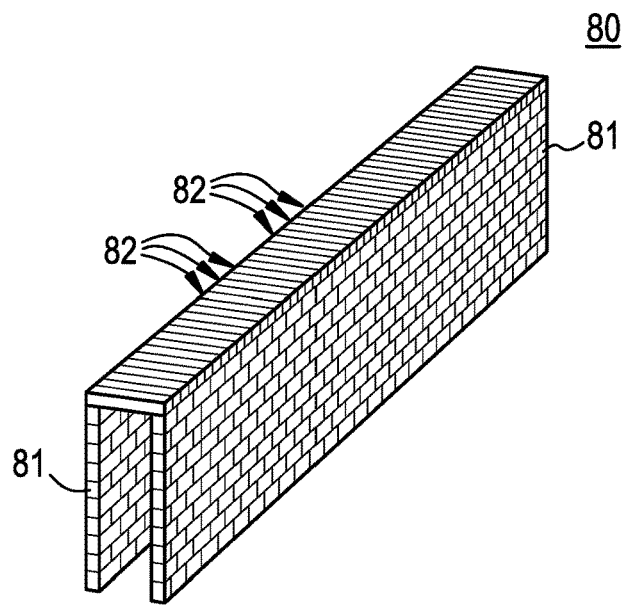
FIG. 2 is a perspective view of a conventional tunnel assembly used in the furnace shown in FIGS. 1A and 1B.
Figure 3:
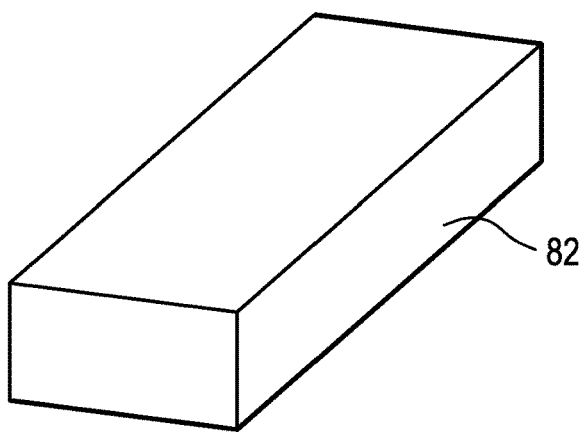
FIG. 3 is a perspective view of a conventional solid lid.
Figure 4:
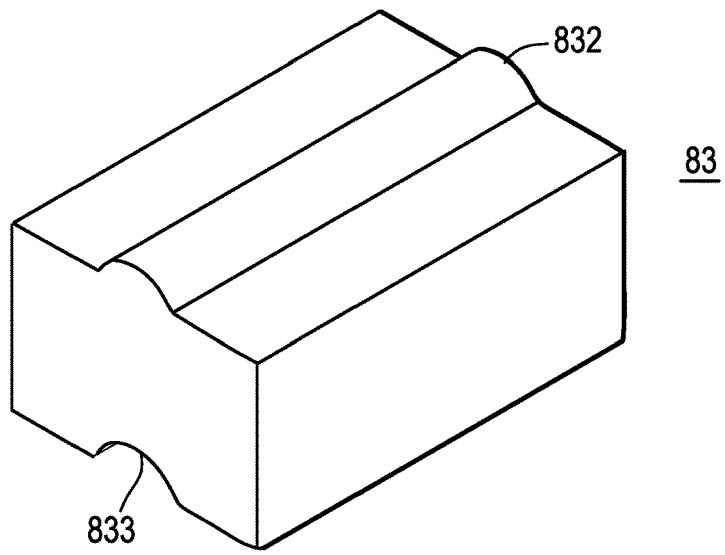
FIG. 4 is a perspective view of a conventional single tongue and grove type block (brick)
Figure 5:
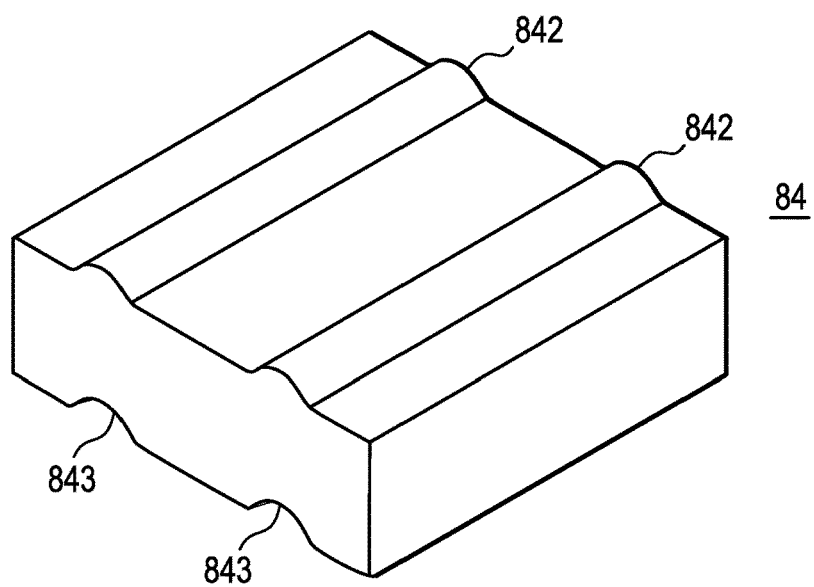
FIG. 5 is a perspective view of a conventional double tongue and grove type block (brick)
Figure 6:
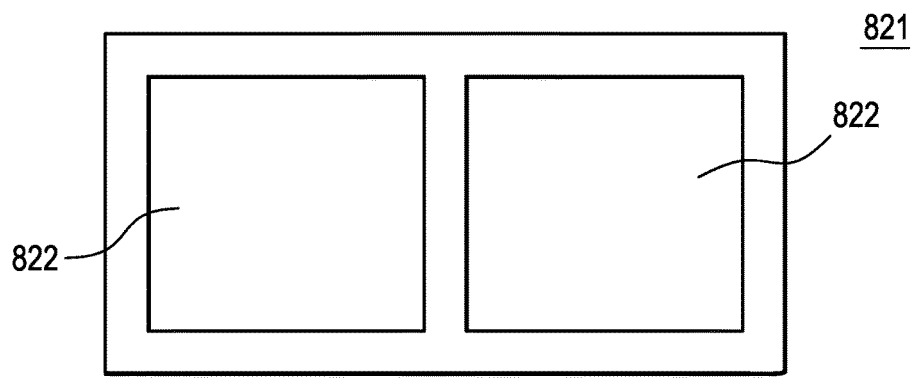
FIG. 6 is an end view of a conventional hollow lid.
Figure 7:
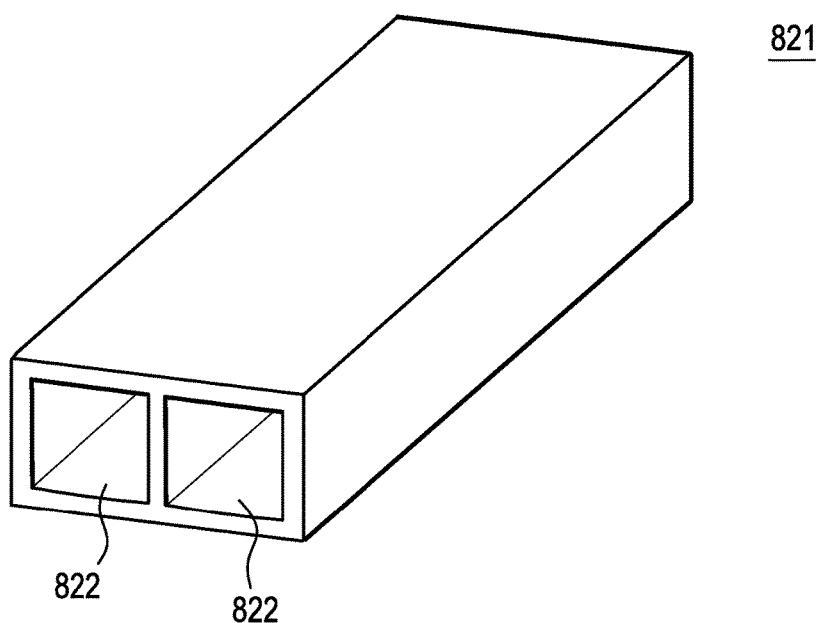
FIG. 7 is a perspective view of the conventional hollow lid shown in FIG. 6.
Figure 8:
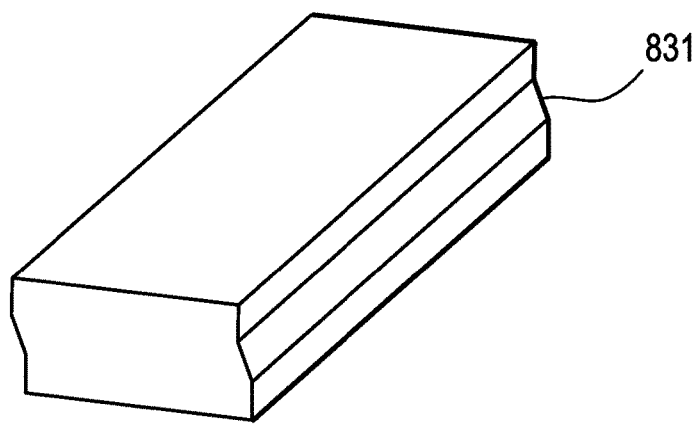
FIG. 8 is a perspective view of a conventional off-set lid.
Figure 9:
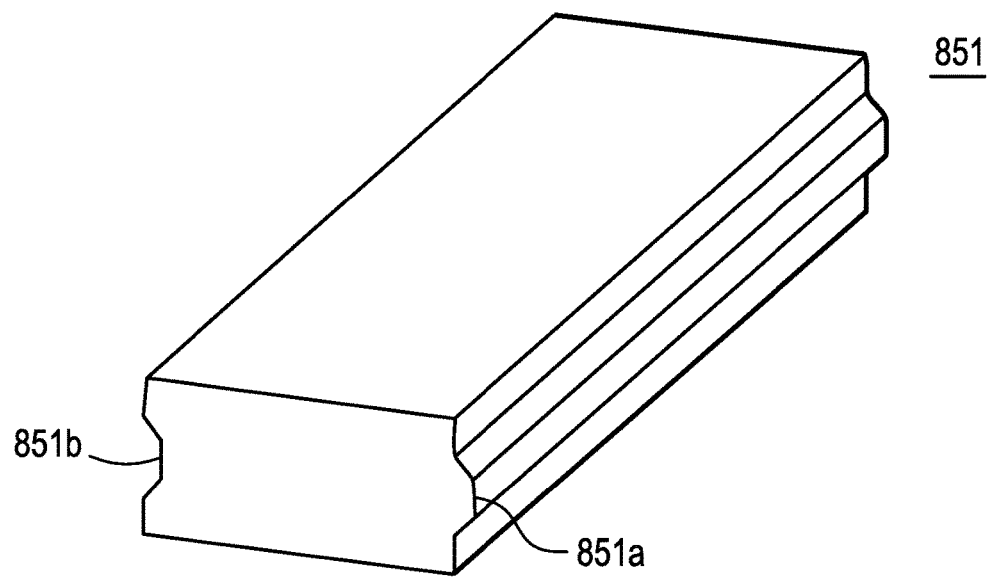
FIG. 9 is a perspective view of a conventional tongue and groove lid.
Figure 14:
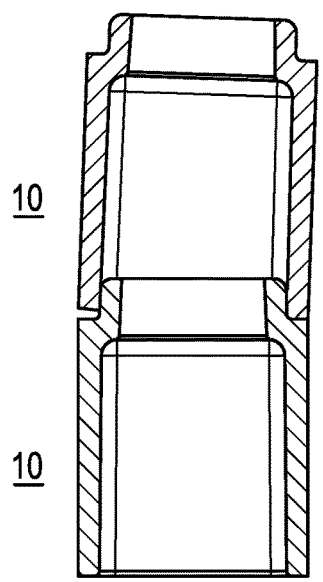
FIG. 14 is a sectional end view of the stacked arrangement shown in FIG. 13 under rotational force to illustrate that the stacked blocks to not disengage.
Figure 15:
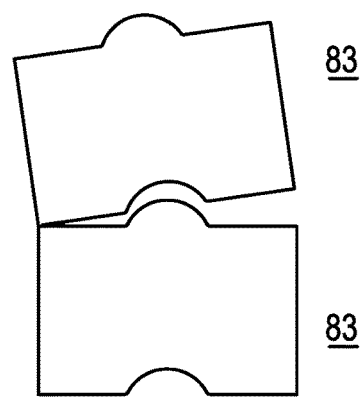
FIG. 15 is an end view of prior art blocks shown in FIG. 4 under rotational force to illustrate that those blocks do disengage under the same type of rotational force.
Figure 34:
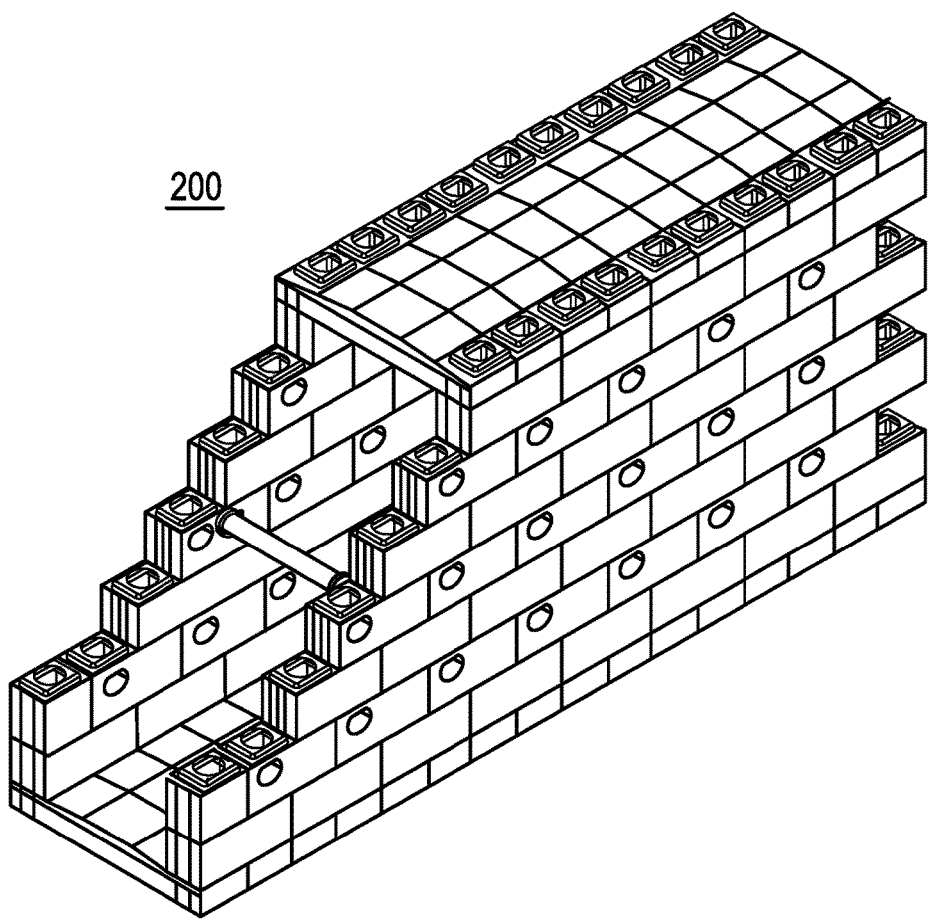
FIG. 34 is a perspective view of the assembly shown in FIG. 31 with some wall blocks removed to show the location of the tie bars.

Preferably, as the blocks 1, 10 are arranged in the formation of the tunnel wall, the blocks 1, 10 are horizontally off-set by one-half of a block length, or by one set of mechanical mating features, to increase the mechanical robustness of the arrangement (see, e.g., FIG. 34). This arrangement also helps prevent buckling, which is arrested by virtue of the robust and tight tolerance interlocking mechanical mating feature, so that the rotation of one block relative to a block below it does not cause direct contact between the respective protruding portion 3 and the opening 4 to break, as shown in FIG. 14. On the other hand, FIG. 15 shows how rotational forces on prior art tongue and groove blocks (see FIG. 4) can cause separation between the blocks, and direct contact between the respective tongue and groove features significantly breaks, which leads to wall collapse.

In order for the tunnel to properly act as a flue for the exit of the furnace, it must have variable inlet conditions (openings in the walls) that allow more gas to enter the tunnel farthest from the exit, and less gas to enter the tunnel closer to the exit. This creates a more uniform distribution of gas and temperature in the furnace. As noted above, conventional tunnel wall designs simply utilize half bricks to create gaps in the walls as various locations. However, such conventional half bricks create unsupported locations on top of the square openings, creating locations for failures. As shown in FIGS. 16-17, the tunnel system according to the present invention utilizes refractory blocks 100, 101 that include one or more through-holes 7 that are formed therein in order to allow gas to enter the tunnel. This design evenly distributes the load created by the through-holes 7 to the surrounding material. The through-holes 7 can be formed when the bricks 100, 101 are initially formed (e.g., cast), or can be formed later by machining or any suitable process.

The through-holes 7 can have any geometry, but preferably have a semi-circular shape. The size of the through-holes 7 can vary from 1 in$^2$ up to substantially to the full size of the block 100, 101, which is typically around 144 in$^2$, but are preferably 12 in$^2$-36 in$^2$. Blocks 100, 101 preferably have one or two through-holes 7 per block, but could have multiple holes in various locations to facilitate the same end result, as desired. These through-holes 7 can be closed, i.e., do not communicate with the interconnected internal cavities 2 of the blocks 100, 101 that form an internal area of the tunnel wall, as shown, or instead, a small number of blocks could have through-holes that are open to the internal area of the tunnel wall.

Figure 16A:
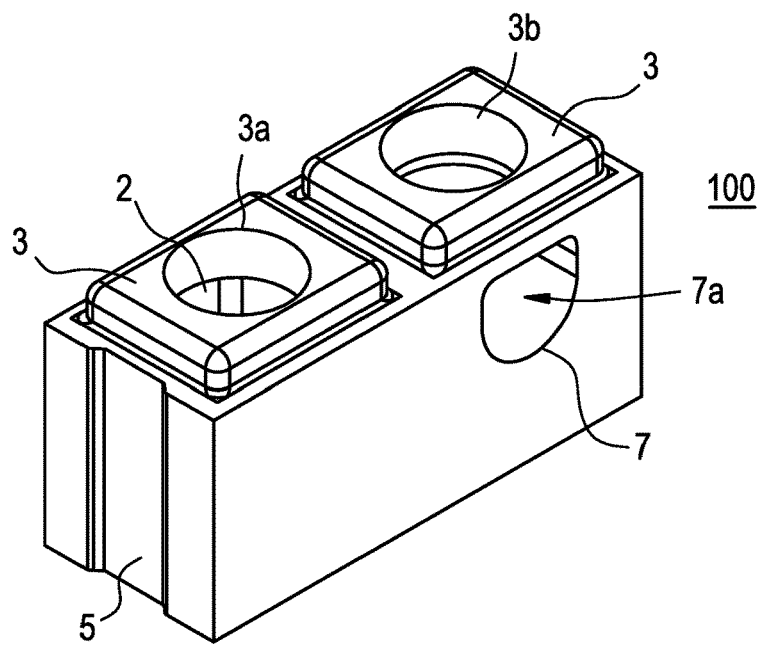
FIGS. 16A and 16B are perspective top and bottom views of a full block including a though-hole.
Figure 16B:
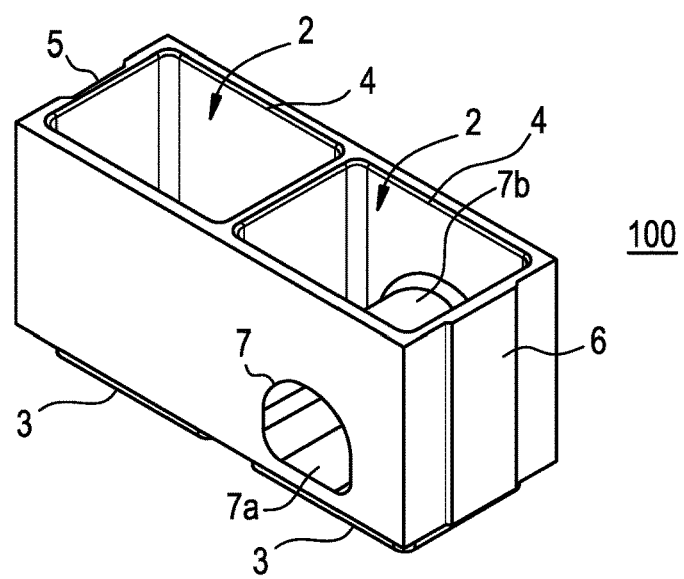
Figure 17:
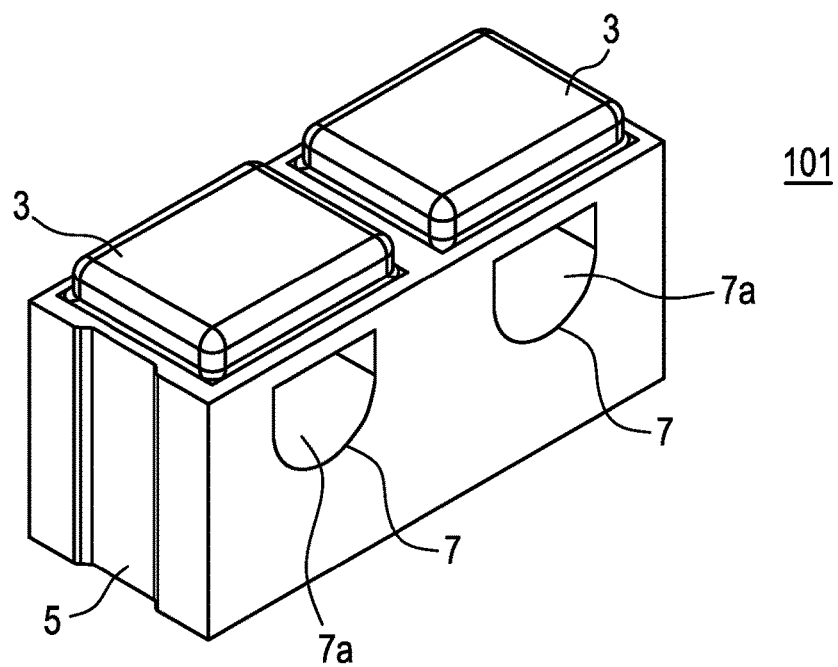
FIG. 17 is a perspective view of a full block having two through-holes.

As shown in FIGS. 16A and 16B, the opening 3b in the protruding portion 3 is simply a removed-material portion, and does not communicate with (not in fluid communication with) the cavity 2. The through-hole 7 is like a tube that passes though the cavity 2, but the internal surface 7a of the through-hole 7 is not in fluid communication therewith, and the through-hole 7 (though which the gasses pass) is therefore closed to the cavities 2 (and therefore the internal surface area of the tunnel wall) by virtue of the external surface 7b of the through-hole 7. FIG. 17 shows a block 101 with two through-holes 7, but in that case, that the protruding portions 3 do not include any material-removed portions. The protruding portions 3 instead have a solid geometry to prevent gas being introduced into the tunnel from going into the wall cavity space (i.e., the internal surface area of the tunnel wall).

Figure 18A:
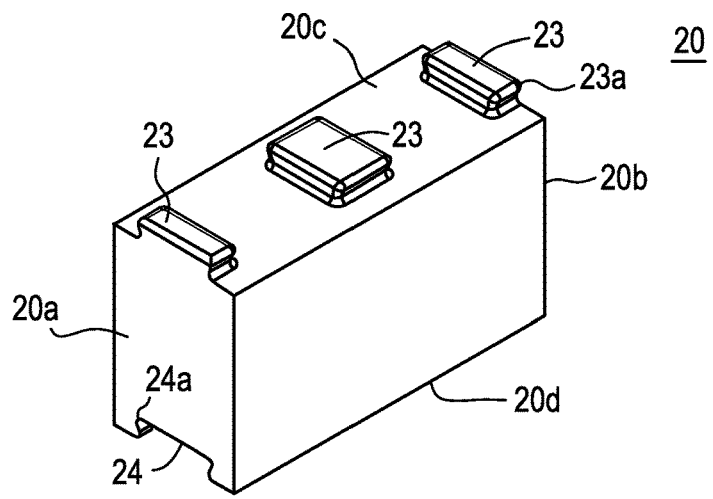
FIGS. 18A and 18B are perspective top and bottom views of a horizontal interlocking full block according to another aspect of the present invention.
Figure 18B:
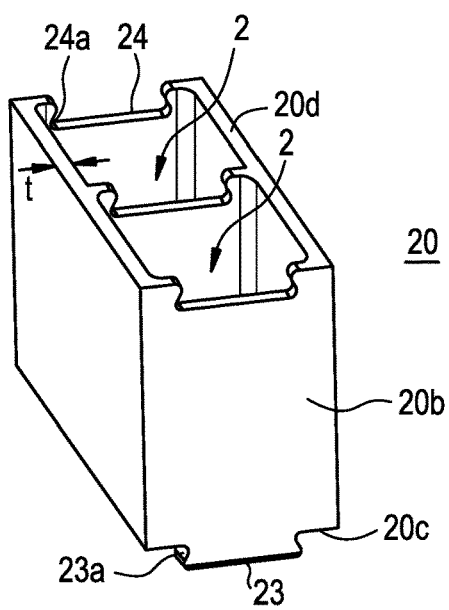
Figure 19:
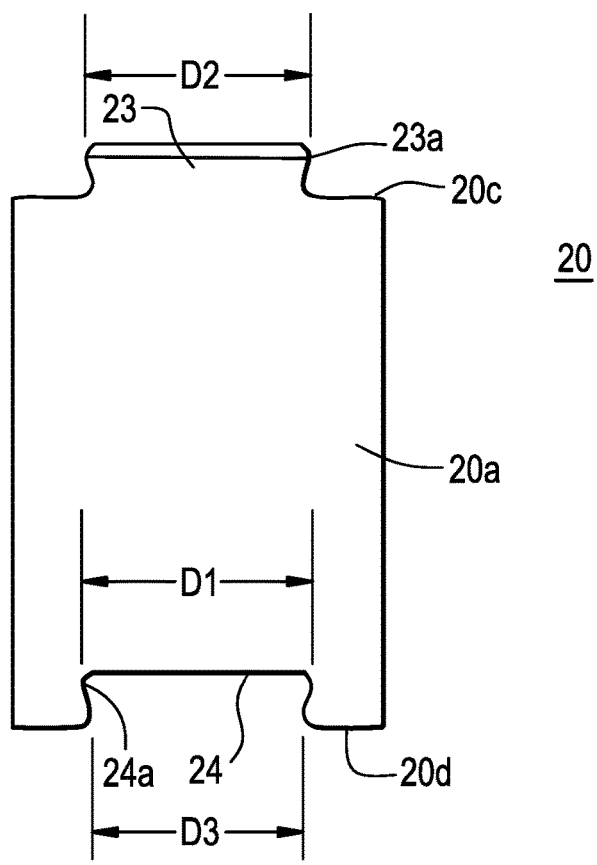
FIG. 19 is an end view of the block shown in FIG. 18.

FIGS. 18-20 show an example of a refractory block 20 according to another aspect of the present invention having a different type of mechanical mating feature that requires vertical installation and which prevents the blocks 20 from becoming disassembled horizontally. Each of the bricks 20 has an outer peripheral surface defining a first end 20*a*, an opposed second end 20*b*, an upper surface 20*c*, and an opposed lower (bottom) surface 20*d*.

The upper surface 20*c* of each block 20 includes a plurality male parts of the precision interlocking mechanical mating feature according to the present invention. The protruding portions 23 are elevated from the surface 20*c* to define a geometrical member that serves as a locking part that fits precisely into the opening (slot) 24 formed in the lower surface 20*d* of the blocks 20 when slidably introduced horizontally. As shown, an end surface of the protruding portions 23 are formed flush with the first end 20*a* of the block 20 (end surface) and the second end 20*b* of the block 20 (end surface). As shown in FIG. 18B, the blocks 20 are hollow, and include a plurality (e.g., two) of cavities 2. If the blocks 20 were to include a through-hole 7 (not shown), the cavities would be formed shallower, and the though-holes would be formed to pass therethough without communicating therewith in most cases. The wall thickness "t" of the block 20 is the same as that described above.

The protruding portions 23 are substantially rectangular elevations or truncated rectangular elevations in shape with chamfered corners. While the exact shape of the protruding portion 23 is not limited to the shapes shown here, any cross-sectional shape where the top dimension is greater than the bottom dimension, such as a modified inverted trapezoidal shape. The protruding portions 23 of the blocks 20 must horizontally fit (slide) precisely within the opening (slot) 24 of the vertically adjacent blocks to securely engage the vertically adjacent blocks to one another to facilitate the construction of a free-standing tunnel walls without the use of mortar. The tolerances must be sufficient to ensure secure mechanical engagement while accounting for thermal expansion considerations and manufacturing variability, as discussed above.

A shown in FIG. 18B, the opening 24 is formed in the block walls along substantially extends along the entire length of the block 20 from the first end 20*a* to the second end 20*b* and slidably receives the protruding portions 23 in a tight, interlocking manner to securely connect the blocks 20 to one another in a vertically stacked manner, as shown in FIG. 20. The protruding portions 23 each also include a lip 23*a* that engages a ridge 24*a* along the opening 24 to further prevent vertical disengagement of the stacked blocks 20. The shape of the opening 24 is not critical, so long as it precisely corresponds in shape and size to the shape and size of the protruding portions 23. As shown, D1>D2>D3.

As shown in FIG. 20, the installation of these blocks 20 are also preferably staggered at a half-width distance, without the use of mortar, so that a single block 20 engages two blocks 20 in the row above it, and two blocks 20 in the row below it (e.g., off-set by one mating feature engagement, as discussed above). This style of mechanical mating also controls the expansion of the blocks 20 by limiting how far any individual part can shift from its original position relative to the blocks 20 around it.

Both of the mechanical mating features described above add redundancy to the system by mechanically engaging the blocks, which prevents the tunnel wall from leaning and falling over without requiring that mating features be sheared off or otherwise break through the wall of the block to which they are connected.

Base Component

Figure 22:
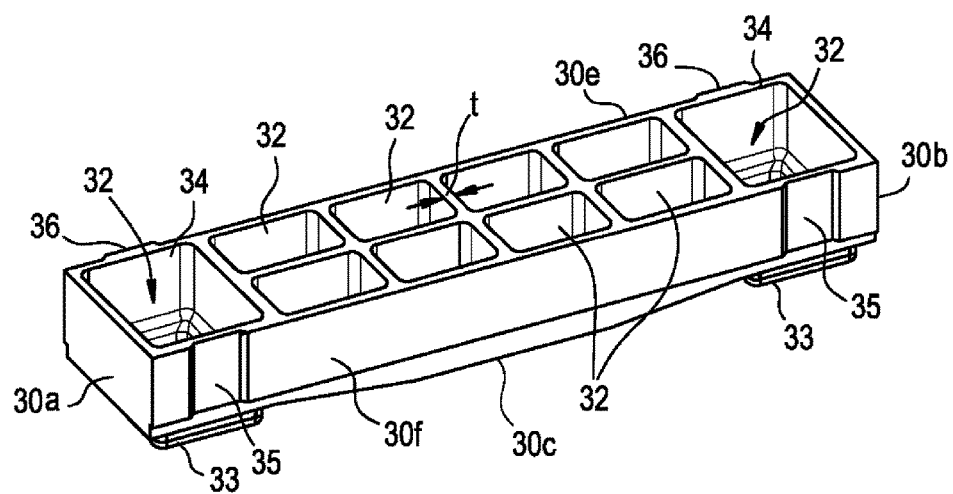
FIG. 22 is a perspective bottom view of the full width base component shown in FIG. 21.

Another feature of the tunnel according to present invention is the base component 30, shown in FIGS. 21 and 22. A plurality of base components 30 run the length of the tunnel and span the horizontal width 'w' of the tunnel to connect the two walls together using the same mating features as the wall blocks 10, 100 described above (see, e.g., FIGS. 33 and 34).

Each base component 30 has an outer peripheral surface with an upper surface 30*c* and an opposed lower (bottom) surface 30*d* on which the interlocking mechanical mating features 33, 34 are formed. The protruding portions 33 correspond to the protruding portions 3 described above in connection with the bocks 1, 10, 100 and the openings 34 correspond to the openings 4 described above in connection with the blocks 1, 10, 100. The same critical dimensional requirements for the mechanical mating members and wall thicknesses discussed above apply to the base components, as well. Preferably, each base component 30 has a total weight in a range of about 75-150 lb, more preferably about 100 lbs.

The protruding portions 33 are provided on the upper surface 30*a* of the base components 30 proximate the two opposed ends 30*a*, 30*b*, so as to correspond to the laterally (horizontally) opposed locations of the tunnel walls to be built thereon. The openings 34 are provided in the bottom surface 30*d* of the base component 30 in corresponding locations, as shown in FIG. 22. The base component 30 has a plurality of cavities 32 from which unnecessary material has been removed to reduce the weight of the base block. As shown, the openings 4 communicate with such cavities 32, and a plurality of additional cavities 32 are provided along the length of the base component 30, separated by interior block walls having sufficient thickness "t" to provide enough material to ensure the structural integrity of the component is maintained. The wall thickness is preferably in a range of 0.5 to 1.5 in, preferably 0.625 to 0.875 in. The base components 30 also have additional mechanical mating/ expansion features such as the grooves 35 formed on side surface 30*f* (see FIG. 22) and protrusion or tab 36 formed on side surface 30*e* (see FIG. 21). These features serve the same purpose and function as the features 5 and 6 described above in connection with the blocks 1, 10. The position of these mechanical/expansion features 35, 36 corresponds to the mating alignment with the other base components 30 and the wall blocks to be stacked thereon, as described below in more detail in connection with FIGS. 31-34.

As noted above, it is important that the size and material of the base component 30 is substantially the same as that of the lid (discussed in more detail below) in order to properly and effectively compensate for thermal and stress factors, although the base is a heavier component, as one skilled in the art can appreciate.

Figure 23:
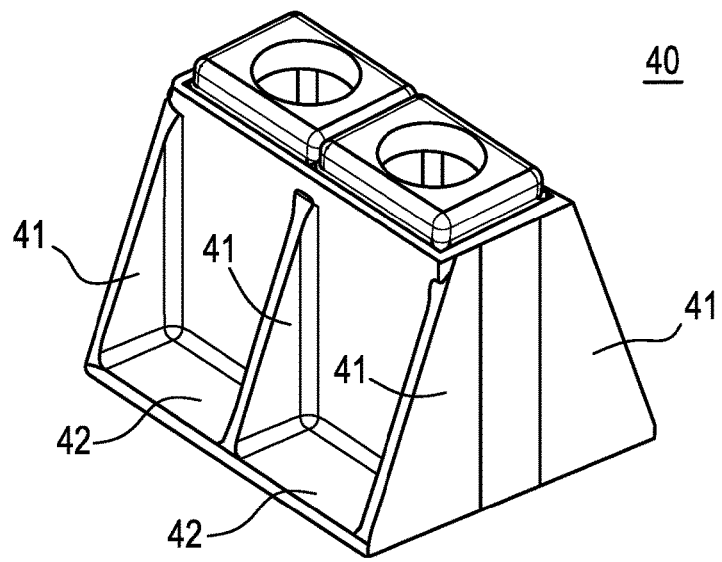
FIG. 23 is a perspective top view of a single side base component according to another aspect of the present invention.
Figure 24:
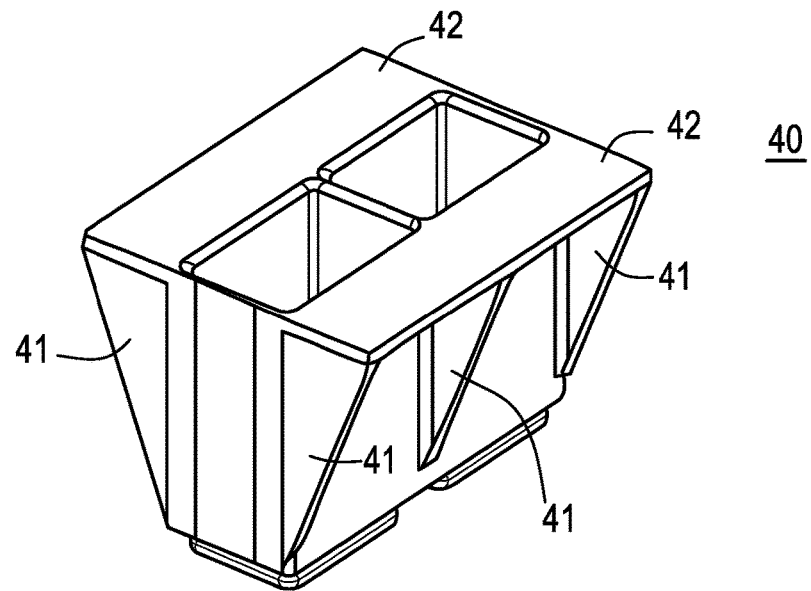
FIG. 24 is a bottom perspective view of the single side base component shown in FIG. 23.

An example of another base component 40 is shown in FIGS. 23 and 24. This base component is referred to as a single side base, and is essentially a standard wall block 10 (see, e.g., FIG. 11) having an enlarged bottom cross-sectional area 42 to spread the weight of the wall over up to three times the standard block area. A sectioned, supported flange 41 can be provided on one or both sides of the base block 40, as shown. The flange structure 41, 42 can be formed as an integral part of the block 40 design when the block 40 is cast, can be formed as separate members and added later with adhesives and/or co-firing techniques, or can be machine-formed (tooled) using known techniques. This design would be particularly appropriate in applications where the use of a secondary process would allow other manufacturing processes to make the same shapes a cast part.

Tie Bars (Also Referred to herein Interchangeably as Cross Beam Supports)

Figure 26:
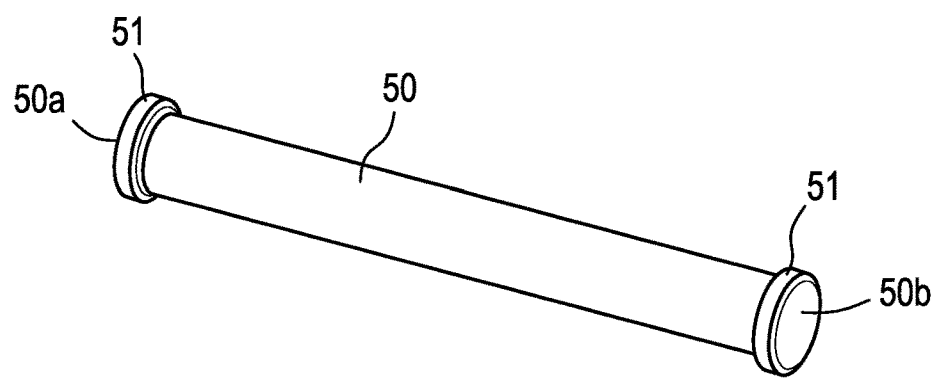
FIG. 26 is a perspective view of a tie bar.
Figure 33:
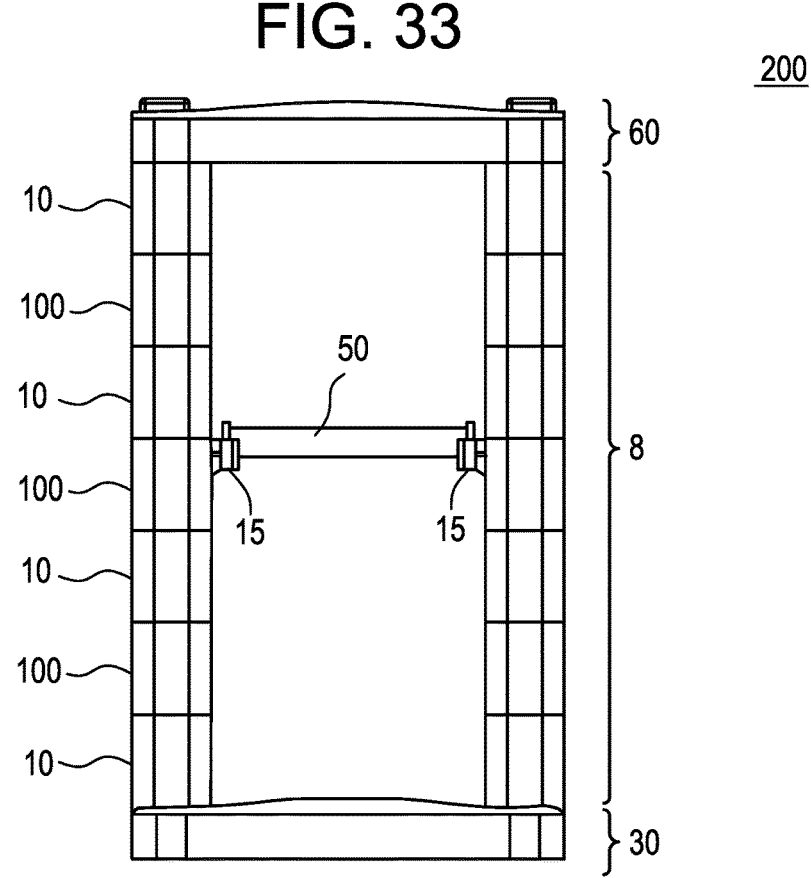
FIG. 33 is an end view of the tunnel assembly shown in FIGS. 31 and 32.

In the present invention, a tie bar component is used in the assembly at various points to secure the walls in place to prevent movement, both inward and outward, as shown in FIGS. 33 and 34. The tie bar 50 (also referred to as a tie rod or cross beam support) is shown in FIG. 26. This tie bar 50 engages and supports the tunnel walls in various ways, as described below.

Figure 25:
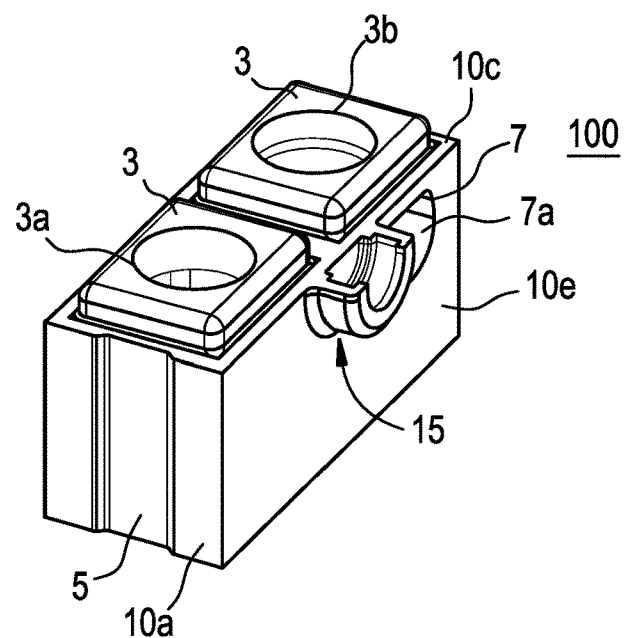
FIG. 25 is a perspective view of the full block shown in FIG. 16, further provided with a tie bar cradle.

FIG. 25 shows one example of a block 100 according to the present invention that further includes a tie bar cradle 15 formed thereon, which is a pre-cast saddle (cradle) formed on a top surface 10c and side surface 10e of the block 100 facing the inside of the tunnel wall. The tie bar cradle 15 is a semi-cylindrical protrusion having interior annular rim features to guide, receive and retain the corresponding annular flanges 51 at the ends 50a, 50b of the tie bar 50 when vertically positioned into place therein (see FIG. 27). Refractory blocks 100 with the cradles 15 formed thereon can be positioned at various locations along the tunnel walls when the tunnel walls are built, and then tie bars 50 can be readily added during installation, or later removed as needed without requiring substantial down time or creating deleterious maintenance issues.

Figure 27:
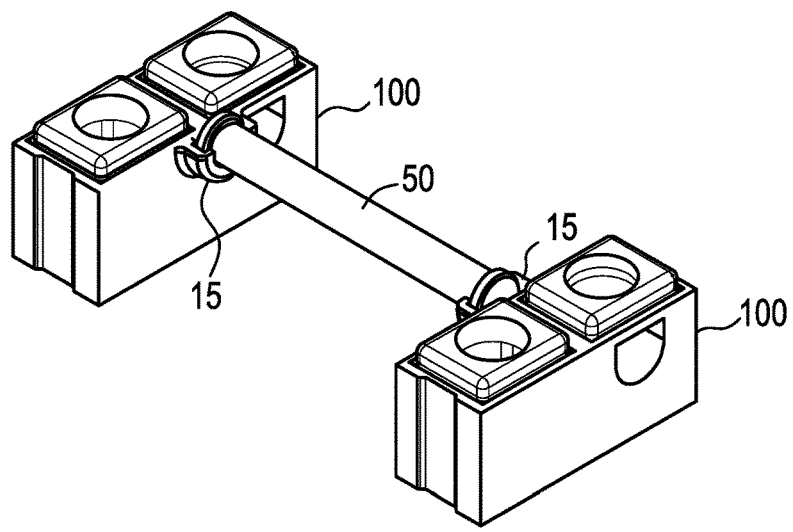
FIG. 27 is a perspective view of two full blocks according to FIG. 25 and a tie rod according to FIG. 26 situated in the respective tie bar cradles and spanning the horizontal distance therebetween.

The tie rods 50 are placed at various points in the system to improve the overall stability of the tunnels in service, as one skilled in the art can readily determine. The tie rods 52 can engage a single point on either side of the wall, as shown in FIG. 27, or multiple points. For example, instead of a single beam-shaped tie bar 50, an H-shaped tie bar (not shown) could be used to instead engage multiple points (2 points on each side) of the opposed tunnel walls at the same time. The span of the tie bar 50 is substantially the same as the span of the top lid and the base component, which can be as small as 12 in or as wide as 60 in, although the preferred size is a range of 24 in to 36 in (corresponding to the internal width of the tunnel). It is understood that the length of the tie bars is governed strictly by the designed width of the tunnel, with clearance to allow for thermal growth. The cross-sectional diameter of the tie bar 50 is preferably 1-8 in, more preferably 3-4 in.

Figure 28:
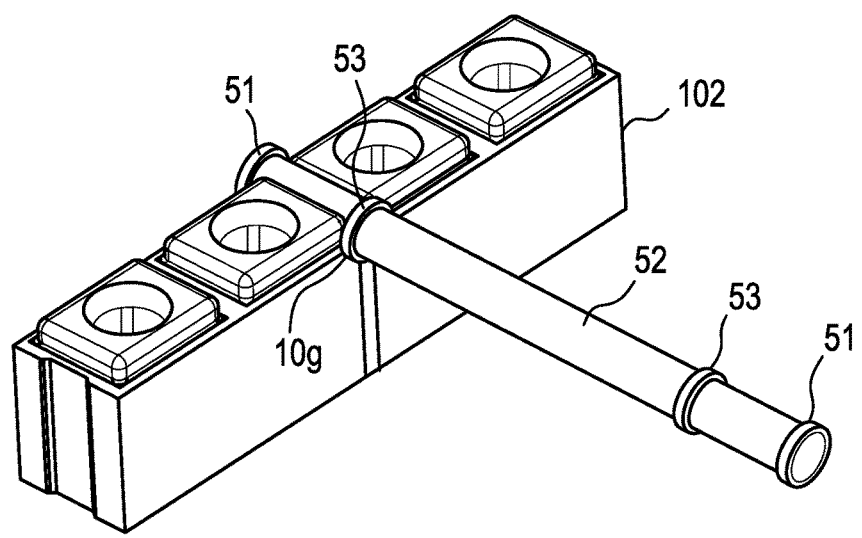
FIG. 28 is a perspective view of two full blocks and another tie bar according to a different aspect of the present invention.

FIG. 28 shows another method of positioning tie bars 52 in the tunnel wall as it is initially constructed. In this case, however, a quarter circle of area in a corresponding portion 10g on each block 102 is removed proximate the upper surface 10c to provide for a location sufficient to accommodate the positioning of a tie rod 52 in a capture area between the flanges 51 and 53 thereof.

Lids (Also Referred to herein Interchangeably as Covers)

In the present invention, the span of the top lid 60 can be as small as 12 in, or as wide as 60 in, although the preferred size is a range of 24 in to 36 in. Preferably, each lid component has a total weight in a range of 50-125 lb, more preferably in a range of 60-80 lbs.

Figure 29:
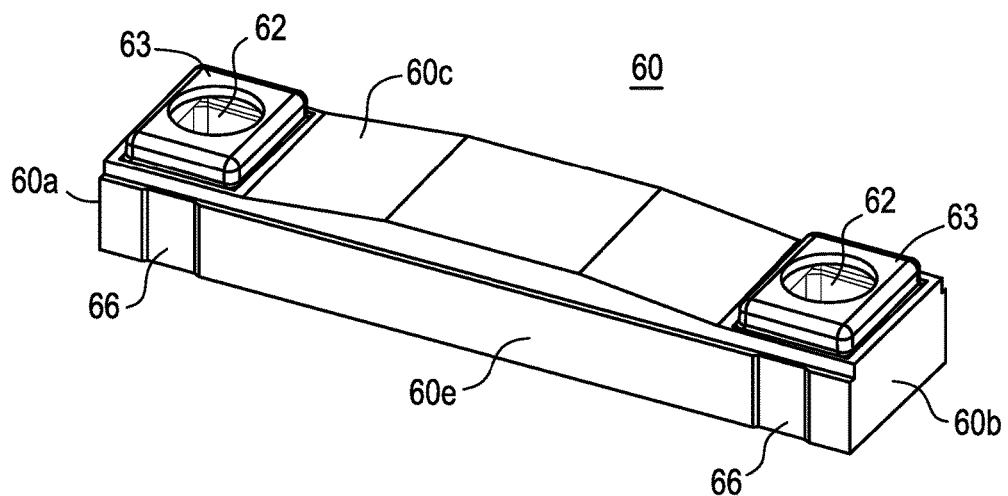
FIG. 29 is a perspective top view of a lid according to the present invention.

As shown in FIG. 29, the upper surface 60c of lid 60 has a flat top with angled sides. The upper surface 60c of the lid also includes the same interlocking mechanical mating features 63 as described above in connection with the blocks 1, 10 and the base components 30. In the case of the lid 60, the protruded portions 63 serve two functions. First, the protruded portions 63 provide mechanical mating features in connection with the corresponding openings 4 on other wall blocks 10, 100 in the same manner discussed above, which enable the lid 60 to be used in an assembly where the lid 60 is not the topmost component, but where additional tunnel wall blocks 10, 100 are instead placed on top of the lid 60, and the walls are continued vertically upward. Second, since the protruded portions 63 extend a distance of at least 0.5 in above (in the vertical direction) the overall surface geometry of the lid 60, this allows for the placement of a plywood board on top of the lid 60 to define a walkway during furnace turnarounds. Because this exists directly above the tunnel walls, the walkway allows workers access into the furnace on top of the tunnels without putting weight onto the center of the unsupported span of the lids, and instead directs all of their weight onto the tunnel walls, where it can be readily supported.

Figure 30:
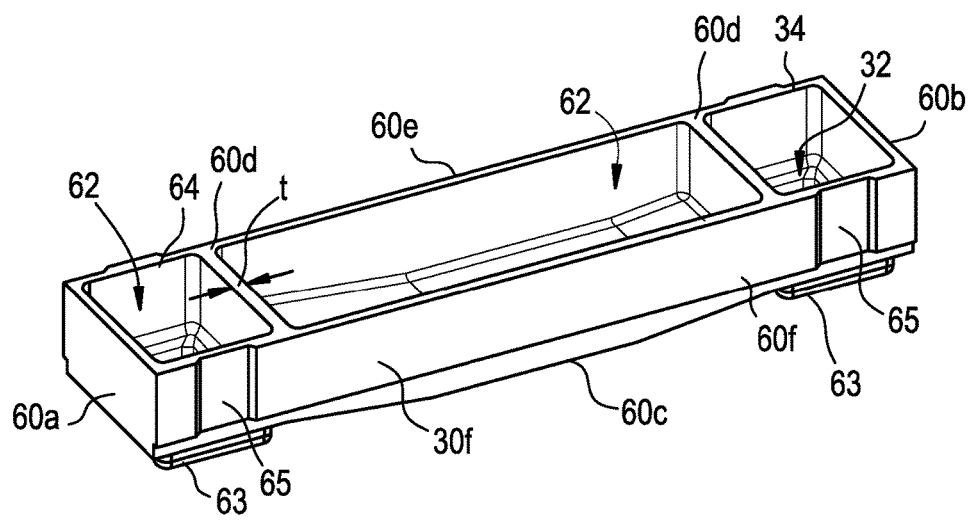
FIG. 30 is a perspective bottom view of the lid shown in FIG. 29.
Figure 31:
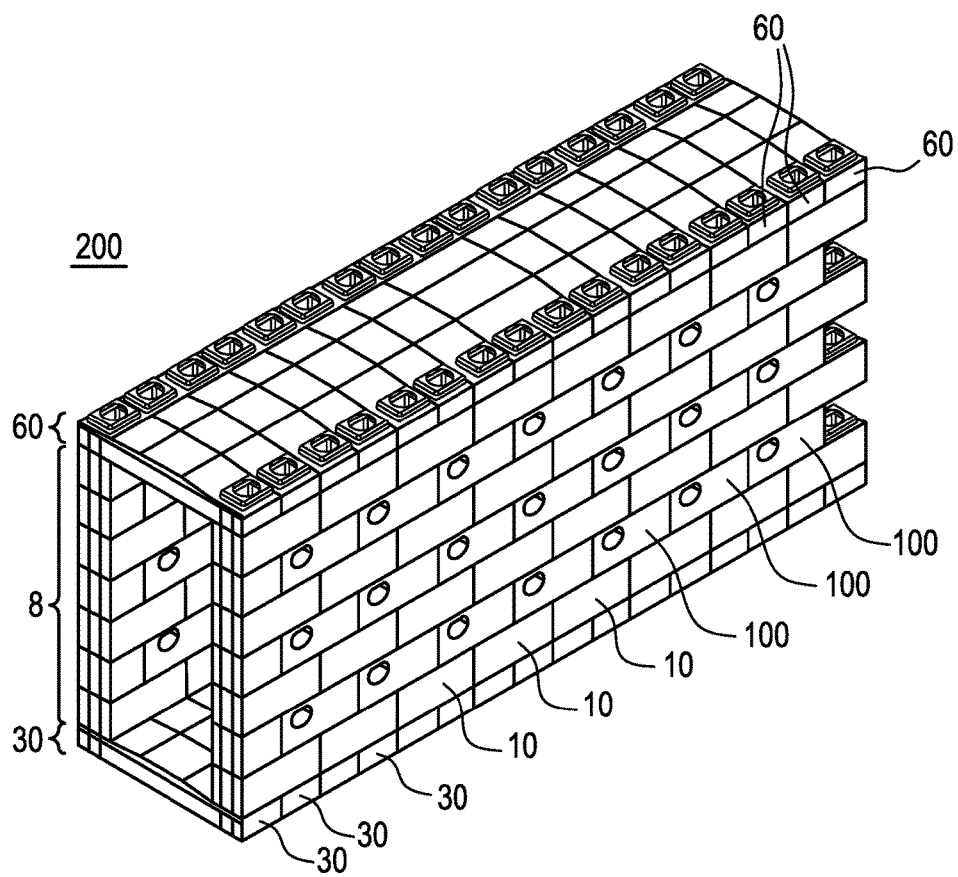
FIG. 31 is a perspective view of a tunnel assembly according to the present invention.
Figure 32:
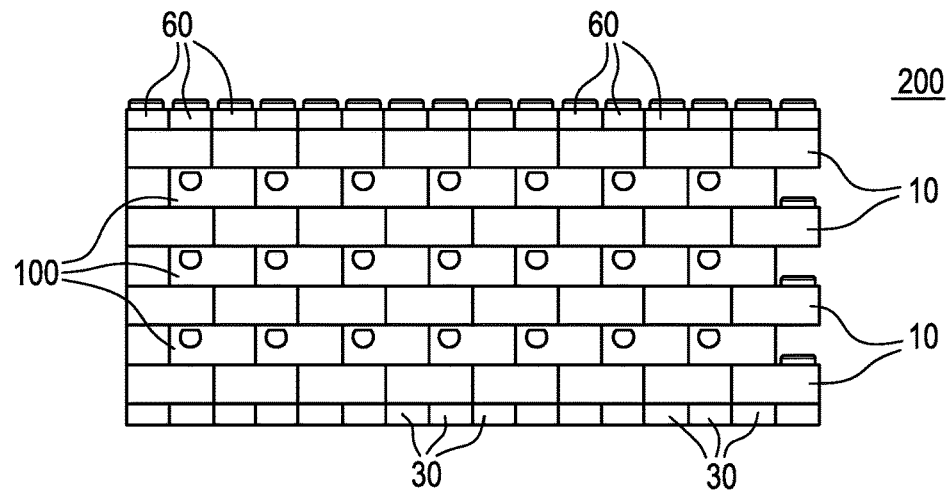
FIG. 32 is a side view of the tunnel assembly shown in FIG. 31.

The lid 60 is also hollowed out from the bottom surface 60d to remove all possible material from non-critical areas, in order to minimize the stress by improving the ratio of force per unit area of the cross section. As shown in FIG. 30, a large central cavity 62 is formed thereby, as well as two smaller cavities 62 in communication with the openings 64 defining the mechanical mating features. The mechanical mating feature (opening) 64 provides engagement with the protruded portions 3 of the blocks 10, 100 forming the walls 8 to securely attach the lid 60 to the walls 8 on either side, spanning the internal tunnel width between wall structure. The critical dimensions of the mechanical mating features are the same as discussed above. Preferably, the wall thickness "t" of the lids is in a range of 0.5 to 1.5 in, more preferably 0.625 to 0.875 in.

The lids 60 also have additional mechanical mating features such as the grooves 65 formed on side surface 30f (see FIG. 30) and protrusion or tab 66 formed on side surface 60e (see FIG. 29). These features serve the same purpose and function as the mechanical mating features/expansion gap features 5 and 6 described above in connection with the blocks 1, 10, 100 and 35, 36 described above in connection with the base component 30. The position of these mating/expansion features 65, 66 corresponds to the mating alignment with the other lids 60 and the wall blocks 10, 100 stacked thereunder, as described below in more detail in connection with FIGS. 31-34. In the present invention, the span of the lid 60 can be as small as 12 in, or as wide as 60 in, although the preferred size is a range of 24 in to 36 in.

The Tunnel Assembly (Also Referred to Interchangeably herein as a Tunnel)

A plurality of base components 30 are arranged to extend horizontally (in a first direction or the horizontal arrangement direction, i.e., defining a width of the tunnel) and are aligned with respect to one another to define a substantially continuous base surface along the longitudinal extension direction (length) of the tunnel. The base components 30 are secured to one another via the mechanical mating members 35, 36 without any mortar. A plurality of wall-forming blocks 10 are vertically stacked onto the base components 30 on both opposed sides, along the longitudinal extension direction of the tunnel, which helps further secure the base components 30 in place. The blocks 10 are arranged in a sequentially off-set manner, by one half of a length on the base components 30, using the respective mechanical mating members 33 (protruding portions from the base components 30) and 4 (openings on the blocks 10) to securely fasten the blocks 10 into place on the base components 30 without the use of mortar. The blocks 10 are also secured to one another via the respective mechanical mating members 5, 6. A plurality of blocks 100 are then stacked vertically and along the longitudinal extension direction on the row of blocks 10 in a similar, half-block off-set manner.

Additional blocks 10, 100 are then alternately stacked onto one another, secured to one another vertically and horizontally, without mortar, via the respective mechanical mating members 3, 4, 5 and 6, continuing in a half-block, off-set manner, to define two parallel, vertically oriented tunnel walls 8 that extend both in the second (i.e., vertical arrangement direction) from the base components 30 and in the longitudinal extension direction of the tunnel. As shown, some of the blocks correspond to the blocks 10 shown in FIG. 11 (without through-holes 7), and some of the blocks correspond to the blocks 100 shown in FIG. 16, which include through-holes 7.

The tunnel walls 8 are spaced a predetermined distance (i.e., 12-60 in, preferably 24 to 36 in) apart from one another in the horizontal arrangement direction, dictated by the horizontal span of the base components 30. Tie bars 50 are inserted into the cradles 15 in desired locations, as needed. The tunnel assembly is secured by placing a plurality of lids 60 across the tops of the tunnel walls 8, which are secured in place onto the uppermost blocks 10 via the mechanical mating features (e.g., openings 64 in the lids and the protruding portions 3 of the wall blocks 10), and further secured to one another via the mechanical mating members 65, 66 in the lids 60 to construct the tunnel 200 (also referred to as a tunnel assembly, see, e.g., FIGS. 31-34).

As discussed above, in the tunnel 200 according to the present invention, reducing the weight of all of the components, while maintaining the structural integrity of each of the individual components, makes it possible to eliminate much of the crushing force on the lower courses of the brick (i.e., the base components 30). Providing light-weight, structurally correct cover (lid) components 60 overcomes the drawbacks previously associated with making conventional lids thicker in order to be stronger, which also detrimentally added additional load to the entire system. The incorporation of controlled expansion gaps between each brick and elimination of mortar from the overall system ensures that the tunnel assembly 200 can expand and contract without creating large cumulative stresses, and reduces the installation time of the tunnel assembly 200 as a whole.

With the reduced wall thickness and improved materials used for the components according to the present invention, the light-weight tunnel lids 60 can be easily installed or removed simply by two laborers. In addition, the light-weight, mortar-free blocks with interlocking mechanical mating features are easily handled by a single laborer, and the tunnel structure 200 can assembled, repaired and/or disassembled as necessary without significant consequences or the requirement for high levels of skill. Cross beam supports (i.e., tie bars 50) can be easily added or removed from the tunnel assembly 200 without limiting access to other tunnel components during turnarounds, ensuring that repairs can be complete and effective. Faster installation and repair time also allows for proper repairs to be made more readily, improving the overall reliability of the system.

While the present invention has been shown and described above with reference to specific examples, it should be understood by those skilled in the art that the present invention is in no way limited to these examples, and that variations and modifications can readily be made thereto without departing from the scope and spirit of the present invention.

What is claimed is:

1. A steam reformer furnace comprising:
   a steam reformer including a catalyst; and
   a tunnel assembly in communication with the steam reformer, the refractory tunnel assembly comprising:
   a plurality of hollow base components, each said base component comprising a plurality of corresponding mechanical mating members;
   a plurality of hollow wall blocks, each said wall block comprising a plurality of corresponding mechanical mating members that further correspond to said mechanical mating members of said base components; and
   a plurality of hollow lid components, each said lid component comprising a plurality of mechanical mating members that further correspond to said mechanical mating members of said base components and said wall blocks;
   wherein said base components are arranged to extend in a horizontal arrangement direction defining a width of said tunnel assembly and a longitudinal arrangement direction defining a length of the tunnel assembly;
   wherein said wall blocks are stacked upon and mechanically interconnected to said base components via said corresponding mechanical mating members, without the use of mortar, in a vertical arrangement direction and along said longitudinal arrangement direction, and are stacked upon one and mechanically interconnected to another via said corresponding mechanical mating members, without the use of mortar, in both said vertical and longitudinal arrangement directions, to define two parallel tunnel walls, spaced a distance apart from one another in the horizontal arrangement direction,
   wherein said tunnel walls extend upwardly from said base components in said vertical arrangement direction and along the length of said tunnel assembly on said base components; and
   wherein said plurality of lid components are stacked upon and mechanically interconnected to said wall blocks via said mechanical mating members, without the use of mortar, in the vertical arrangement direction and along said longitudinal arrangement direction, so that said lids extend along the longitudinal arrangement direction and the horizontal arrangement direction in order to cover said distance between said tunnel walls along at least a portion of said length of said tunnel assembly.

2. The steam reformer furnace according to claim 1, wherein said base components, said wall blocks and said lid components all comprise the same material.

3. The steam reformer furnace according to claim 1, wherein said plurality of mechanical mating members comprise at least one pair of male and female components provided in corresponding locations on upper and lower surfaces of each of said base components, said wall blocks and said lid components.

4. The steam reformer furnace according to claim 3, wherein said male components comprise a protruded portion extending from the upper surfaces of each of each of said base components, said wall blocks and said lid components, and wherein said female components comprise a corresponding opening in the lower surfaces of the each of said base components, said wall blocks and said lid components.

5. The steam reformer furnace according to claim 3, wherein said at least one pair of corresponding male and female components comprises two pairs of male and female components provided in corresponding locations on upper and lower surfaces of each of said base components, said wall blocks and said lid components.

6. The steam reformer furnace according to claim 1, wherein at least a portion of said plurality of wall blocks further comprise at least one through-hole having openings formed in opposed side surfaces thereof, said though-hole being in communication with said tunnel but not being in communication with an inner cavity of said wall blocks.

7. The steam reformer furnace according to claim 1, wherein at least a portion of said plurality of blocks further comprise a tie bar cradle formed in a side surface thereof proximate an upper surface thereof.

8. The steam reformer furnace according to claim 7, further comprising at least one tie bar extending between said tunnel walls in said horizontal extension direction.

9. The steam reformer furnace according to claim 1, wherein a wall thickness of said wall block is in a range of 0.65 to 0.875 in.

10. The steam reformer furnace according to claim 1, wherein a wall thickness of said base component and said lid component is in a range of 0.65 to 0.875 in.

* * * * *